(12) United States Patent
Kapinos et al.

(10) Patent No.: US 11,880,587 B2
(45) Date of Patent: Jan. 23, 2024

(54) WRITING AUDITABLE TRACES OF A DATA WIPE TO A STORAGE DEVICE

(71) Applicant: Lenovo (Singapore) Pte. Ltd., New Tech Park (SG)

(72) Inventors: Robert J. Kapinos, Durham, NC (US); Scott Li, Cary, NC (US); Robert James Norton, Jr., Raleigh, NC (US); Russell Speight VanBlon, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 126 days.

(21) Appl. No.: 17/537,973

(22) Filed: Nov. 30, 2021

(65) Prior Publication Data
US 2023/0168836 A1 Jun. 1, 2023

(51) Int. Cl.
*G06F 3/06* (2006.01)

(52) U.S. Cl.
CPC .......... *G06F 3/0655* (2013.01); *G06F 3/0604* (2013.01); *G06F 3/0652* (2013.01); *G06F 3/0676* (2013.01); *G06F 3/0677* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 2014/0022849 A1* | 1/2014 | Krutzik | ................ | G11C 16/22 |
| | | | | 365/185.33 |
| 2018/0083854 A1* | 3/2018 | Munjal | ................ | G06F 21/78 |

* cited by examiner

*Primary Examiner* — Charles J Choi
(74) *Attorney, Agent, or Firm* — Kunzler Bean & Adamson

(57) ABSTRACT

Methods, systems, apparatus, and program products that can write auditable traces of a data wipe to a storage device are disclosed herein. One method includes performing, by a processor, a set of overwrite operations of a data wipe on a storage device, generating a set of auditable traces for the data wipe, and writing the set of auditable traces to the storage device. Systems, apparatus, and computer program products that include hardware and/or software that can perform the methods for writing auditable traces of a data wipe to a storage device are also disclosed herein.

20 Claims, 18 Drawing Sheets

WRITING AUDITABLE TRACES OF A DATA WIPE TO A STORAGE DEVICE

FIELD

The subject matter disclosed herein relates to electronic devices and more particularly relates to writing auditable traces of a data wipe to a storage device.

BACKGROUND

Repurposing computing devices, storage devices, and memory is common in today's world. Typically, when a computing device, storage device, and/or memory is repurposed, the data stored in the computing device, storage device, and/or memory is wiped so that the previous user's data is not shared and/or accessible to the new user. In some situations, it may be important to ensure that and/or be able to verify whether the data stored in a computing device, storage device, and/or memory that is going to be repurposed has been wiped of its data. Additionally, or alternatively, in the event that a data wipe has not successfully wiped the previous user's data from a computing device, storage device, and/or memory, it may be important to obtain and/or identify information about the data wipe operations performed on the computing device, storage device, and/or memory. Currently, there is no way to audit a data wipe performed on a computing device, storage device, and/or memory using auditable traces of the data wipe written to the computing device, storage device, and/or memory.

BRIEF SUMMARY

Apparatus, methods, systems, and program products that can write auditable traces of a data wipe to a storage device are disclosed herein. An apparatus, in one embodiment, includes a processor and a memory that stores code executable by the processor. In certain embodiments, the code is executable by the processor to perform a set of overwrite operations of a data wipe on a storage device, generate a set of auditable traces for the data wipe, and write the set of auditable traces to the storage device.

One embodiment of a method that can write auditable traces of a data wipe to a storage device includes performing, by a processor, a set of overwrite operations of a data wipe on a storage device. In some embodiments, the method further includes generating a set of auditable traces for the data wipe and writing the set of auditable traces to the storage device.

A computer program product, in one embodiment, includes a computer-readable storage medium including program instructions embodied therewith. In certain embodiments, the program instructions are executable by a processor to cause the processor to perform a set of overwrite operations of a data wipe on a storage device, generate a set of auditable traces for the data wipe, and write the set of auditable traces to the storage device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
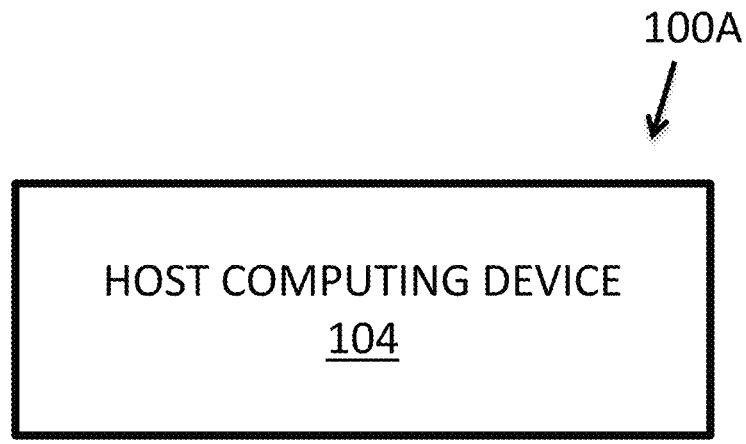
FIGS. 1A through 1D are schematic block diagrams illustrating various embodiments of a system that can write auditable traces of a data wipe to a storage device.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Apparatus, methods, systems, and program products that can write auditable traces of a data wipe to a storage device are disclosed herein. An apparatus, in one embodiment, includes a processor and a memory that stores code executable by the processor. In certain embodiments, the code is executable by the processor to perform a set of overwrite operations of a data wipe on a storage device, generate a set of auditable traces for the data wipe, and write the set of auditable traces to the storage device.

One embodiment of a method that can write auditable traces of a data wipe to a storage device includes performing, by a processor, a set of overwrite operations of a data wipe on a storage device. In some embodiments, the method further includes generating a set of auditable traces for the data wipe and writing the set of auditable traces to the storage device.

A computer program product, in one embodiment, includes a computer-readable storage medium including program instructions embodied therewith. In certain embodiments, the program instructions are executable by a processor to cause the processor to perform a set of overwrite operations of a data wipe on a storage device, generate a set of auditable traces for the data wipe, and write the set of auditable traces to the storage device.

With reference to the drawings, FIG. 1A is a schematic block diagram of one embodiment of a computing system 100A that can write auditable traces of a data wipe to a storage device. At least in the illustrated embodiment, the computing system 100A includes, among other components, a host computing device 102.

In some embodiments (see, e.g., FIG. 1B), a computing system 100B that can write auditable traces of a data wipe to a storage device includes a host computing device 102 coupleable to a storage device 202. In various embodiments, the storage device 202 of the computing system 100B is external to, independent of, and/or separate from the host computing device 102. In certain embodiments, the storage device 202 of the computing system 100B has been removed from an external computing device (not shown) that is separate from and/or independent of the host computing device 102 and can be data wiped by the host computing device 102.

Figure 1B:
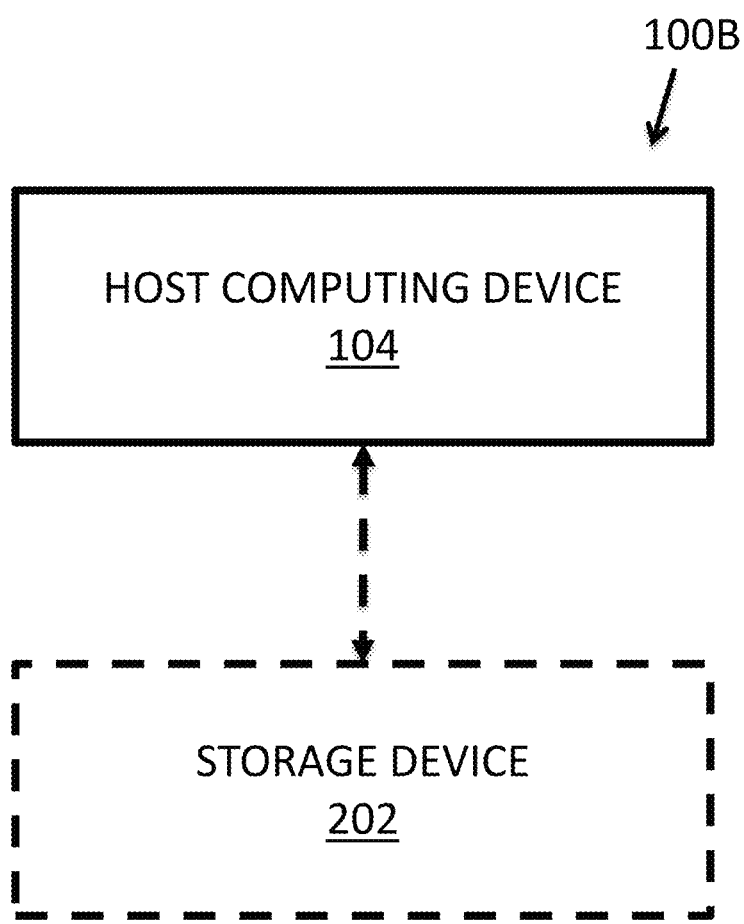
Figure 1C:
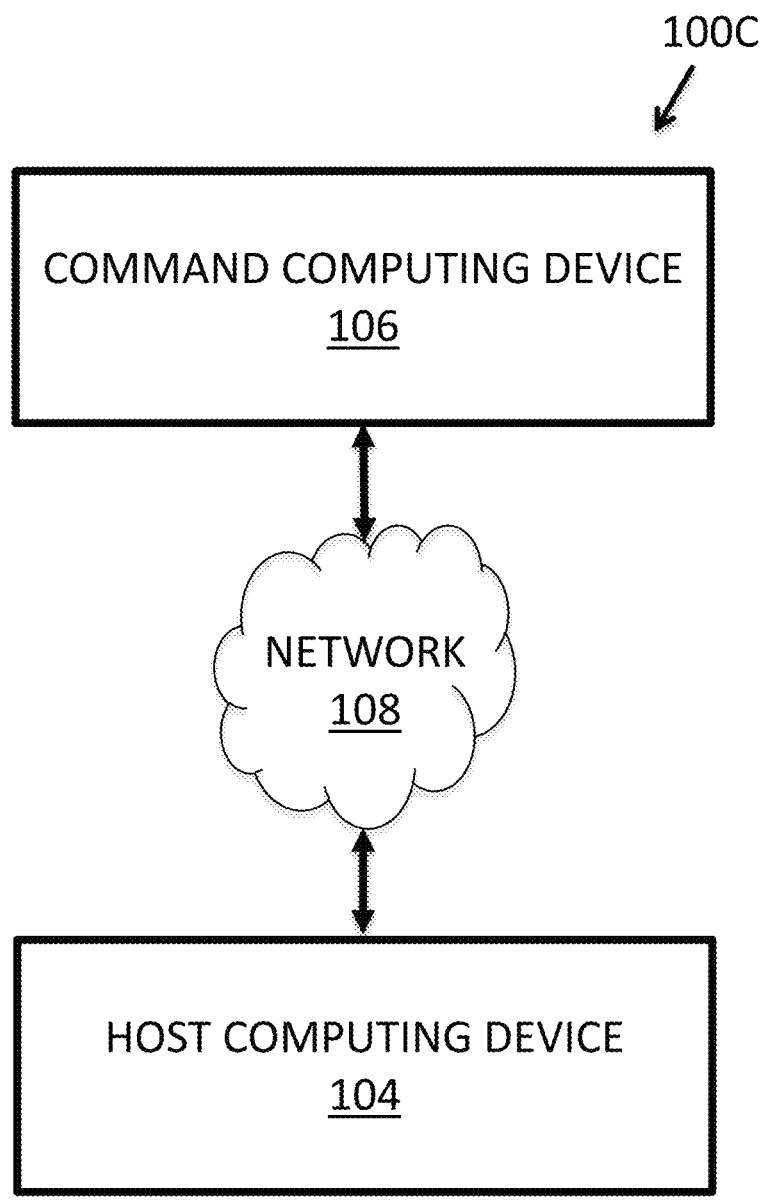

Referring to FIG. 1C, FIG. 1C is a schematic block diagram of another embodiment of a computing system 100C (and/or computing network 100C) that can write auditable traces of a data wipe to a storage device. At least in the illustrated embodiment, the computing system 100C includes, among other components, a host computing device 102 coupled to and/or in communication with a command computing device 104 via a network 106 (e.g., a wired and/or wireless network).

In some embodiments (see, e.g., FIG. 1D), a computing system 100D that can write auditable traces of a data wipe to a storage device includes a host computing device 102 coupleable to a storage device 202. At least in the illustrated embodiment, the computing system 100D includes, among other components, a host computing device 102 coupled to and/or in communication with a command computing device 104 via a network 106 (e.g., a wired and/or wireless network).

In various embodiments, the storage device 202 of the computing system 100D is external to, independent of, and/or separate from the host computing device 102. In certain embodiments, the storage device 202 of the computing system 100D has been removed from an external computing device (not shown) that is separate from and/or independent of the host computing device 102 and can be data wiped by the host computing device 102.

Figure 2A:
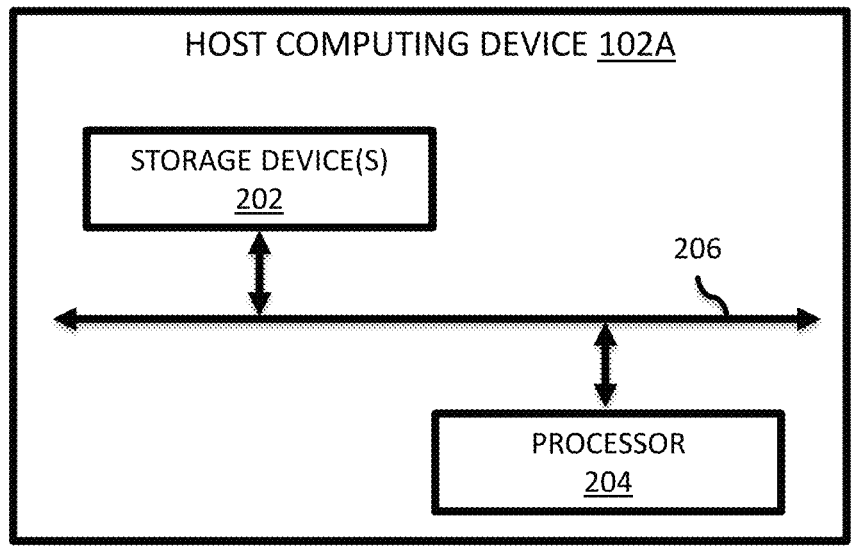
FIGS. 2A through 2C are schematic block diagrams illustrating various embodiments of a storage device included in the systems of FIGS. 1A through 1D.
Figure 2B:
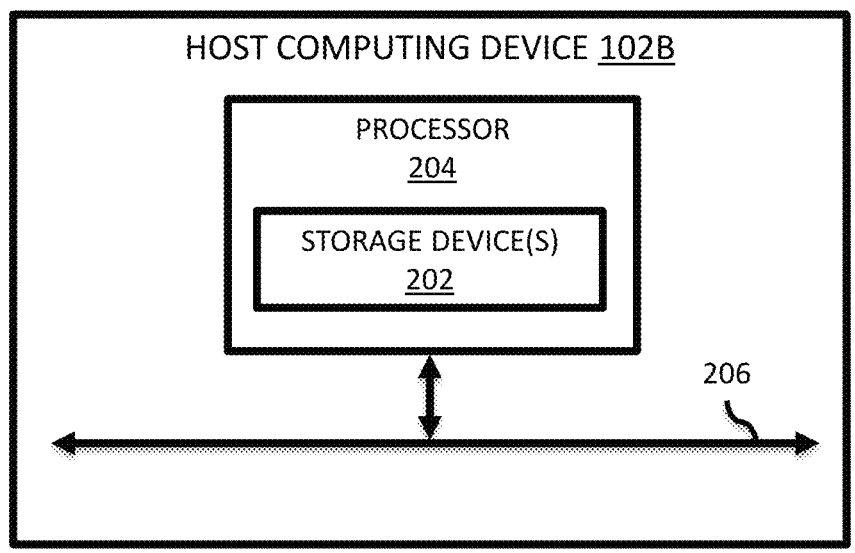
Figure 2C:
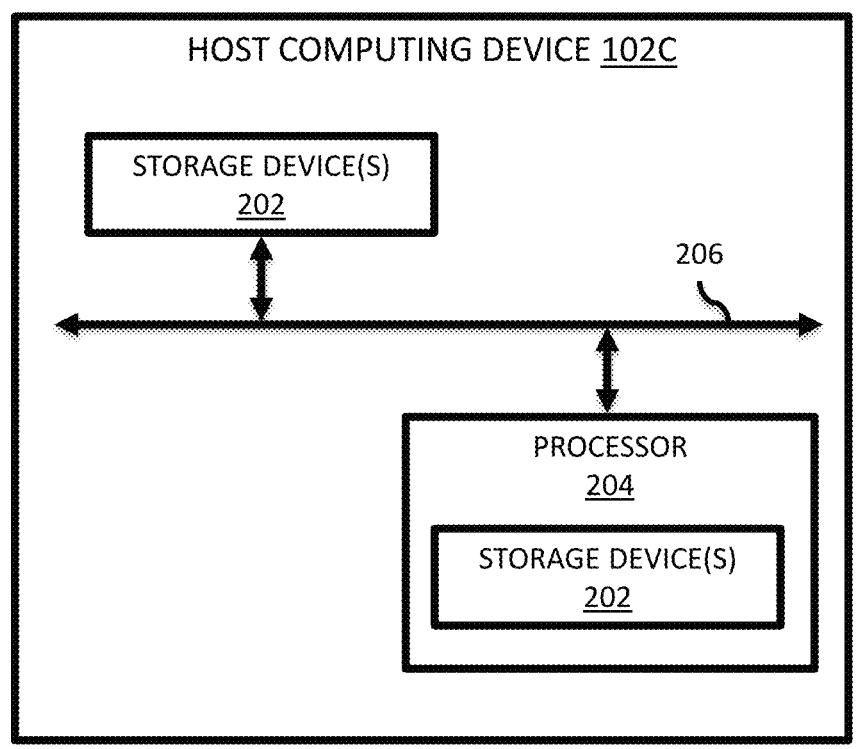

With reference to FIGS. 2A through 2C, FIGS. 2A through 2C illustrate various embodiments of a host computing device 102A, 102B, and 102C (also simply referred to individually, in various groups, or collectively as, host computing device(s) 102), respectively, that can be included in the computing system 100A, computing system 100B, computing system 100C, and/or computing system 100D (also simply referred to individually, in various groups, or collectively as, computing system(s) 100). A host computing device 102, in various embodiments, can write and/or facilitate auditable traces of a data wipe to a storage device 202.

A host device 102 may include any suitable computing system and/or computing device that is known or developed in the future. Examples of a host computing device 102 include, but are not limited to, a laptop computer, a desktop computer, a personal digital assistant (PDA), a tablet computer, a smart phone, a cellular telephone, a smart television (e.g., televisions connected to the Internet), a wearable device, an Internet of Things (IoT) device, a game console, a vehicle on-board computer, a streaming device, and a smart device, etc., among other computing devices that are possible and contemplated herein, which can be referred to generally as, an information handling device.

At least in the embodiment illustrated in FIG. 2A, a host computing device 102A includes, among other components, one or more storage devices 202 coupled to and/or in communication with a processor 204 via a bus 206 (e.g., a wired and/or wireless bus). At least in the embodiment illustrated in FIG. 2B, a host computing device 102B includes, among other components, a processor 204 that includes one or more storage devices 202 coupled to and/or in communication with a bus 206. At least in the embodiment illustrated in FIG. 2C, a host computing device 102C includes, among other components, one or more storage devices 202 coupled to and/or in communication with, via a bus 206, a processor 204 that includes one or more storage devices 202.

A storage device 202 (e.g., a storage device 202 that is internal and/or external to a host computing device 202) may include any suitable type of device and/or system that is known or developed in the future that can store computer-useable and/or computer-readable code and/or data. In various embodiments, a storage device 102 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

A storage device 202, in some embodiments, includes volatile computer storage media. For example, a storage device 202 may include random access memory (RAM), including dynamic RAM (DRAM), synchronous dynamic RAM (SDRAM), and/or static RAM (SRAM). In other embodiments, a storage device 202 includes non-volatile computer storage media. For example, a storage device 202 may include a hard disk drive, a flash memory, and/or any other suitable non-volatile computer storage device that is known or developed in the future. In various embodiments, a storage device 202 includes both volatile and non-volatile computer storage media.

In some embodiments (see, e.g., computing systems 100B and 100D), the storage device 202 is a stand-alone device. In other embodiments, the storage device 202 is an independent device and/or component that has been removed from an external computing device (e.g., an information handling device).

In various embodiments, (see, e.g., computing systems 100A through 100D), the storage device 202 is an independent device and/or component that is currently located on a host computing device 102. In additional or alternative embodiments of computing systems 100A through 100D, the storage device 202 is device and/or component that forms at least a portion of a host computing device 102.

Figure 3:
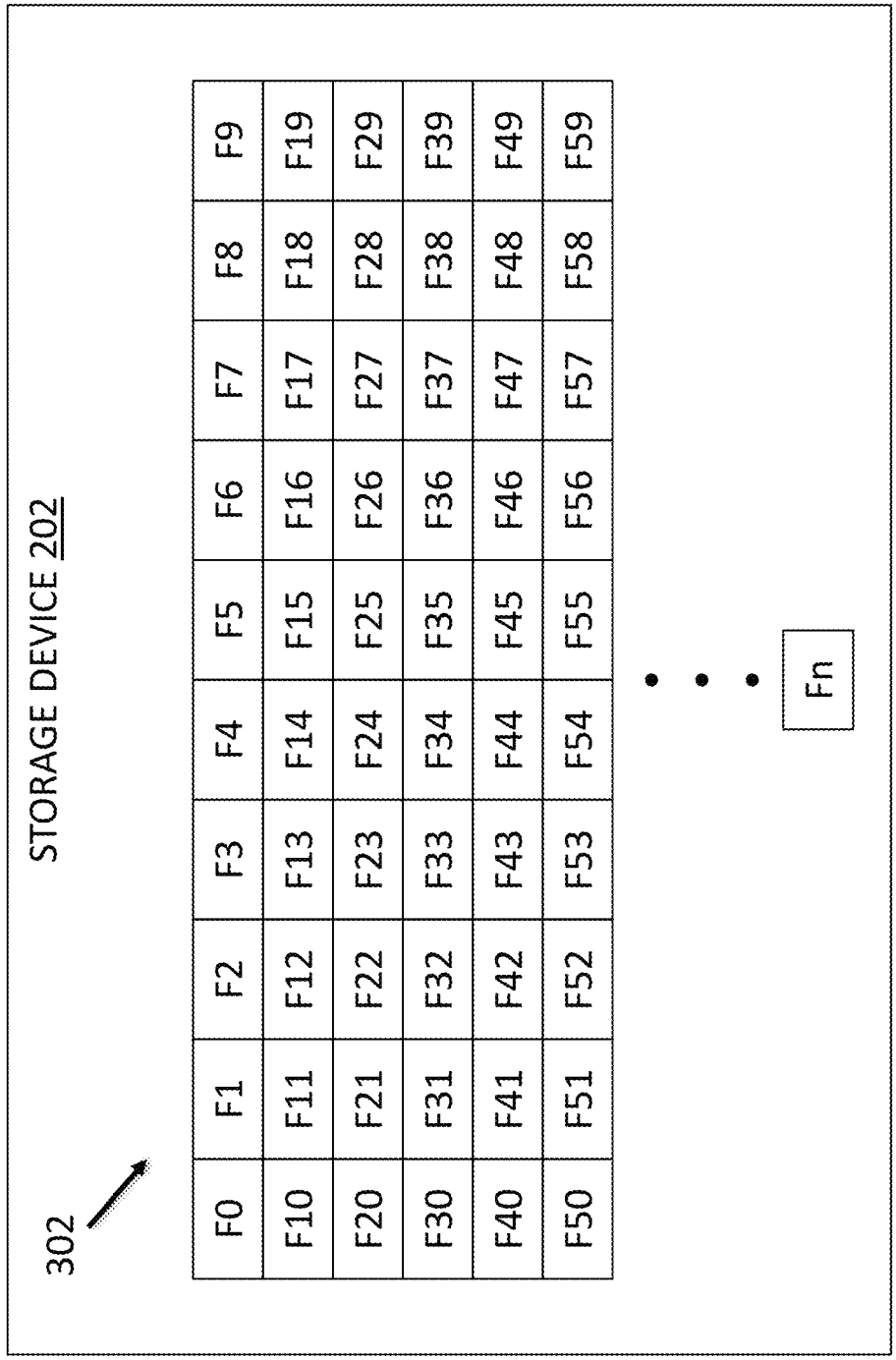
FIG. 3 is schematic block diagram illustrating one embodiment of a storage device included in the systems of FIGS. 1A through 1D.

With reference to FIG. 3, FIG. 3 is a block diagram illustrating that various embodiments of a storage device 202 can include a set of storage sectors 302. Each storage sector 302 in a storage device 202 is capable of storing data that is written to it, which can include any suitable type of data that is known or developed in the future. Further, the data written to and/or stored in each storage sector 302 is capable of being overwritten with one or more iterations of other data and/or new data to effectively remove, erase, delete, and/or write over the current data being stored in a storage sector 302 as at least a portion of a data wipe of a storage sector 302 and/or data wipe operations performed on a storage sector 302.

A set of storage sectors 302 in the storage device 202 may include any suitable quantity of storage sectors 302 greater than or equal to one (1) storage sector 302. In various embodiments, the set of storage sectors 302 includes a plurality of storage sectors 302 (e.g., "n" storage sectors 302 in the embodiment illustrated in FIG. 3).

In the embodiment illustrated in FIG. 3, each storage sector 302 is provided with a respective identifier (e.g., F0, F1, . . . Fn), which can also represent an address for each of the storage sectors 302. While the embodiment illustrated in FIG. 3 shows at least sixty-one (61) storage sectors 202 (e.g., F0-F59 and Fn), the various embodiments of the storage device 102 is not limited to 61 storage sectors 302. That is, various other embodiments of a storage device 202 may include a quantity of storage sectors 302 that is greater than or less than 61 storage sectors 302.

In various embodiments, one or more of storage sectors 302 of a storage device 202 is/are configured to store a set of traces of a data wipe. That is, one or more auditable traces of a data wipe or data wipe operations can be written to and stored in one or more storage sectors 302 of the storage device 202, as discussed elsewhere herein.

In some embodiments, each storage sector 302 of a storage device 202 is configured to store the auditable trace(s) of a data wipe. In other embodiments, a storage device 202 is configured so that at least one storage sector 302 stores the auditable trace(s) of a data wipe and at least one at least one storage sector 302 does not store the auditable trace(s) of the data wipe, as discussed elsewhere herein.

In additional or alternative embodiments, at least one storage sector 302 of a storage device 202 is pre-determined to store the auditable trace(s) of a data wipe. In certain embodiments, the pre-determined storage sector 302 is a set and/or specific location and/or address on the storage device 202. In various non-limiting examples, the auditable trace(s) of a data wipe are stored in the first storage sector 302 (e.g., F0), a middle storage sector (e.g., F29 and/or F30), and/or the last storage sector 302 (e.g., Fn) of a storage device 202, among other quantities and/or locations/addresses that are possible and contemplated herein.

In further additional or alternative embodiments, a set of auditable traces of a data wipe is/are stored in one or more randomly selected storage sectors 302 of a storage device 202. In various non-limiting examples, the auditable trace(s) of a data wipe can be randomly stored in a storage sector 302 with a location/addresses of F17, F39, and/or F54 of a storage device 202, among other quantities of random locations and/or addresses that are possible and contemplated herein.

In still further additional or alternative embodiments, a set of auditable traces of a data wipe is/are stored in multiple storage sectors 302 of a storage device 202 spaced apart a determined quantity of storage sectors 302, which can be any suitable spacing (e.g., 2 apart, 3 apart, 4 apart, 5 apart, 10 apart, 20 apart, 50 apart, 100 apart, etc., among other quantities and/or spacing of locations and/or addresses that are possible and contemplated herein). In various non-limiting examples, the auditable trace(s) of a data wipe can be stored in odd numbered storage sectors 302, even numbered storage sectors 302, prime numbered storage sectors 302, etc., among other quantities and/or spacing of locations and/or addresses that are possible and contemplated herein.

In some embodiments, one or more sets of auditable traces stored in the storage sector(s) 302 is/are encrypted, as discussed elsewhere herein. The set of auditable traces, in certain embodiments, is signed with a private key (e.g., by the data wiper) and the data wipe can be validated via a public key (e.g., by an end user and/or data wipe auditor) authenticating the private key, which can be considered and/or refer to as, an asymmetric pair of keys or asymmetric key pair, as further discussed elsewhere herein. In additional embodiments, a storage device 202 is configured to include an eye catcher written to and stored in a storage sector 302 that is storing a set of auditable traces so that the eye catcher and the auditable trace(s) are co-located in the same storage sector 302, as also discussed elsewhere herein.

In additional or alternative embodiments, a set of auditable traces for a data wipe stored in one or more storage sectors 302 and/or a data tag of a storage sector 302 of a storage device 202 is/are encrypted via a stream cipher. Here, the stream cipher encrypted auditable trace(s) and/or data tag(s) can substantially prevent and/or facilitate preventing unauthorized data from being stored in a storage device 202 and/or the storage sector(s) 302 of a storage device 202.

In certain embodiments, one or more of storage sectors 302 of a storage device 202 is/are configured to store a set of fake traces of a data wipe. That is, one or more fake auditable traces of a data wipe or data wipe operations can be stored in one or more storage sectors 302 of the storage device 202, as discussed elsewhere herein. In various embodiments, one or more storage sectors 302 of a storage device 202 is/are configured to store a set of traces of a data wipe (e.g., one or more real and/or legitimate traces of a data wipe) and one or more storage sectors 302 of the storage device 202 is/are configured to store a set of fake traces of a data wipe (e.g., one or more phony and/or illegitimate traces of a data wipe).

In further additional or alternative embodiments, two or more storage sectors 302 (e.g., multiple storage sectors 302) in a storage device 202 are connected to one another for validating a data wipe. That is, invalidation of a data wipe for one storage sector 302 invalidates the data wipe for other connected storage sector(s) 302. In certain embodiments, all of the storage sectors 302 in a storage device 202 are connected to one another for validating a data wipe such that invalidating the data wipe for one storage sector 302 invalidates the data wipe for all of the storage sectors 302 in the storage device 202.

With reference again to FIGS. 2A through 2C, a set of memory devices 202 may include any suitable quantity of memory devices 202. Further, a storage device 202 may include any suitable type of device and/or system that is known or developed in the future that can store computer-useable and/or computer-readable code. In various embodiments, a storage device 202 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 204).

A storage device 202, in some embodiments, includes volatile computer storage media. For example, a storage device 202 may include random access memory (RAM), including dynamic RAM (DRAM), synchronous dynamic RAM (SDRAM), and/or static RAM (SRAM). In other embodiments, a storage device 202 includes non-volatile computer storage media. For example, a storage device 202 may include a hard disk drive, a flash memory, and/or any other suitable non-volatile computer storage device that is known or developed in the future. In various embodiments, a storage device 202 includes both volatile and non-volatile computer storage media.

Figure 4A:
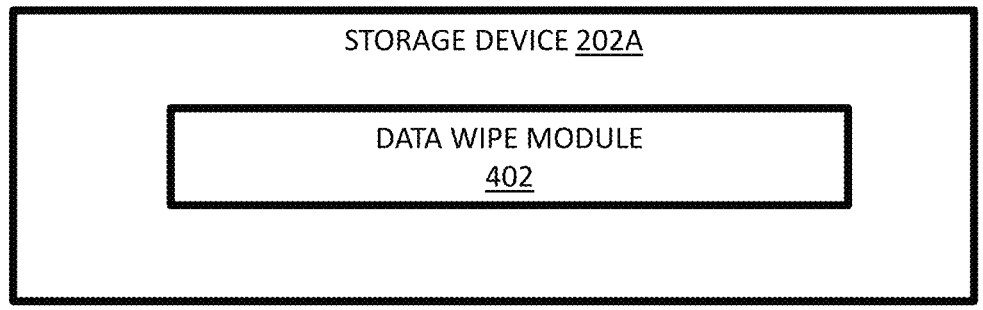
FIGS. 4A and 4B are schematic block diagrams illustrating various embodiments of a memory device included in the host computing devices of FIGS. 2A through 2C.

With reference now to FIG. 4A, FIG. 4A is a schematic block diagram of one embodiment of a storage device 202A. At least in the illustrated embodiment, the storage device 202A includes, among other components, a data wipe module 402 configured to operate/function when executed by the processor 204 to write auditable traces of a data wipe to one or more storage sectors 302.

A data wipe module 402 may include any suitable hardware and/or software that can perform data wipe operations on storage sectors 302 of a storage device 202. The data wipe operations can be performed on the storage sectors 302 while the storage device 202 is located in a host computing device 102 and/or is independent of the host computing device 102 (e.g., after being removed from an external computing device).

Figure 5:
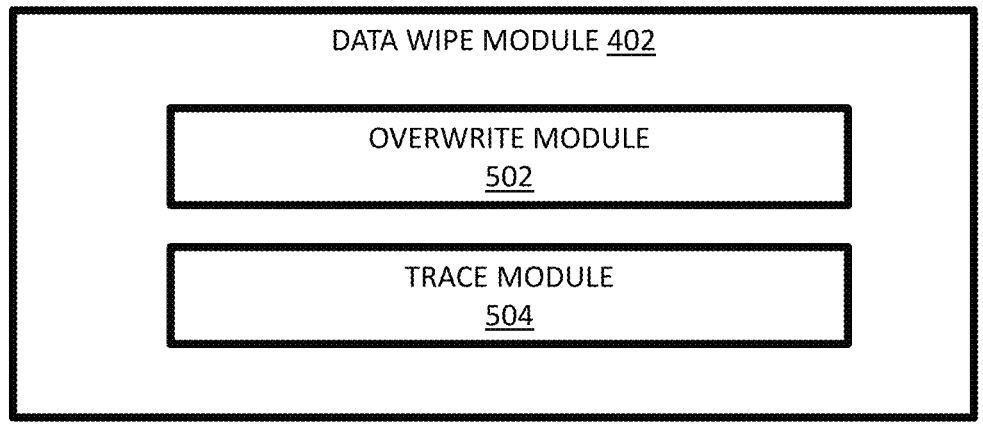
FIG. 5 is a block diagram illustrating one embodiment of a data wipe module included in the storage devices of FIGS. 4A and 4B.

With reference now to FIG. 5, FIG. 5 is a block diagram of one embodiment of a data wipe module 402. At least in the embodiment illustrated in FIG. 5, a data wipe module 402 includes, among other components, an overwrite module 502 and a trace module 504 that operate/function in conjunction with one another when executed by the processor 204 to write auditable traces of a data wipe to a storage device 202.

An overwrite module 502 may include any suitable hardware and/or software that is capable of deleting and/or erasing data from a storage device 202 (e.g., the storage sectors 302) via a set of overwrite operations. The set of overwrite operations may include any suitable overwrite operations that are known or developed in the future that can effectively delete, erase, and/or remove data from a storage device 202 and/or storage sectors 302.

In various embodiments, the set of overwrite operations can effectively delete, erase, and/or remove the data from a storage device 202 and/or the storage sector(s) 302 of a storage device 202 by writing over the existing data written to and stored on the storage device 202 and/or storage sectors 302 of the storage device 202 with other data and/or "new" data, among other suitable techniques capable of deleting, erasing, and/or removing the data from a storage device 202 and/or storage sectors 302 of a storage device 202 that are possible and contemplated herein. The other and/or new data may include any suitable data that can, by being written over the existing data written to and/or stored on a storage device 202 and/or the storage sector(s) 302 of a storage device 202, effectively delete, erase, and/or remove the existing data from the storage device 202 and/or the storage sector(s) 302 of the storage device 202.

The other and/or new data can include any suitable combination(s) of one or more random sequences and/or patterns of data and/or one or more pre-determined sequences and/or patterns of data that can be written to a storage device 202 and/or the storage sector(s) 302 of a storage device 202. In some embodiments, the other and/or new data can include one or more combinations of one or more random sequences/patterns of pre-determined data and/or random data and/or one or more pre-determined sequences/patterns of pre-determined data and/or random data written to a storage device 202 and/or the storage sector(s) 302 of a storage device 202.

In various embodiments, the other and/or new data includes one or more combinations of one or more random sequences/patterns of zeros (0 s) and/or ones (1 s)) and/or one or more pre-determined sequences/patterns of 0 s and/or ones 1 s. In certain embodiments, the other and/or new data can include one or more combinations of one or more random sequences/patterns of pre-determined order(s) of 0 s and 1 s and/or random order(s) of 0 s and 1 s and/or one or more pre-determined sequences/patterns of pre-determined order(s) of 0 s and 1 s and/or random order(s) of 0 s and is written to a storage device 202 and/or the storage sector(s) 302 of a storage device 202.

The overwrite operations performed by the overwrite module 502 may include any suitable quantity of iterations of overwriting the existing data with other/new data that can effectively delete and/or remove the existing data on the storage device 202 and/or storage sectors 302 by replacing or writing over the existing data on the storage device 202 and/or storage sectors 302 with other/new data. In some embodiments (e.g., low security embodiments), the overwrite operations include a quantity of iterations in the range of about one (1) iteration to about ten (10) iterations, among other quantities of iterations greater than about 10 iterations that are possible and contemplated herein. In other embodiments (e.g., medium security embodiments), the overwrite operations include a quantity of iterations in the range of about 10 iterations to about one hundred (100) iterations, among other quantities of iterations less than about 10 iterations and greater than about 100 iterations that are possible and contemplated herein. In still other embodiments (e.g., high security embodiments), the overwrite operations include a quantity of iterations in the range of about 100 iterations to about one thousand (1000) iterations, among other quantities of iterations less than about 100 iterations and greater than about 1000 iterations that are possible and contemplated herein.

While the above embodiments of the overwrite operations performed by the overwrite module 502 include the specific labels of, low security, medium security, and high security, the various embodiments of the overwrite operations are not limited to these labels. That is, various other embodiments may include any suitable quantity of labels greater than three (3) labels and/or a smaller than 3 labels that are possible and contemplated herein.

Further, while each specific label includes a specific range of iterations, the various embodiments are not limited to these ranges. That is, various other embodiments of each label may include a greater quantity and/or a smaller quantity of iterations that are possible and contemplated herein than the various quantities of iterations discussed above.

In some embodiments, each iteration of a set of overwrite operations utilizes the same other and/or new data in overwriting the existing the data currently written to and/or stored on a storage device 202 and/or the storage sector(s) 302 of a storage device 202. In other embodiments, each iteration of a set of overwrite operations utilizes different other and/or new data in overwriting the existing the data currently written to and/or stored on a storage device 202 and/or the storage sector(s) 302 of a storage device 202. In further embodiments, a set of overwrite operations can alternate between different sequences of other and/or new data in overwriting the existing data currently written to and/or stored on a storage device 202 and/or the storage sector(s) 302 of a storage device 202, which alternating sequences can include any suitable quantity of sequences greater than or equal to two different sequences of other and/or new data that are possible and contemplated herein.

A trace module 504 may include any suitable hardware and/or software that is capable of generating and writing data identifying and/or describing information (e.g., data and/or one or more parameters) related to a data wipe and/or data wipe operations performed on a storage device 202 and/or the storage sector(s) 302 of a storage device 202 for storage in the storage device 202 and/or the storage sector(s) 302 of a storage device 202. In various embodiments, the data identifying and/or describing the parameter(s), data, and/or the information related to a data wipe and/or data wipe operations performed on a storage device 202 and/or the storage sector(s) 302 of a storage device 202 can be audited and/or viewed/reviewed and are individually and/or collectively referred to herein as, a set of traces, one or more traces, a set of auditable traces, and/or one or more auditable traces. That is, the parameter(s), data, and/or information related to a data wipe and/or data wipe operations performed on a storage device 202 and/or the storage sector(s) 302 of a storage device 202 can be viewed/reviewed and/or audited by the user(s) of the storage device 202, the entity/entities and/or individual(s) that performed the data wipe/data wipe operations, and/or one or more third-party auditors of the data wipe/data wipe operations.

Each parameter and/or the information included in a set of auditable traces can include any suitable parameter and/or information that can be useful for auditing a data wipe and/or one or more data wipe operations. Example parameters can include, but are not limited to, first data identifying how the data wipe was performed (e.g., what technique(s) and/or process(es) were utilized, the quantity of iterations performed, the other/new data used to overwrite the storage device 202 and/or the storage sector(s) 302 of a storage device 202, which storage sector(s) 302 of a storage device 202 were erased/overwritten, etc. for the data wipe/data wipe operations as a whole and/or for each data wipe operation, second data identifying when the data wipe was performed (e.g., a time stamp for the data wipe/data wipe operations as a whole and/or for each data wipe operation, third data identifying a geographic location where the data wipe was performed (e.g., the geographic location of the storage device 202, the geographic location of the host computing device 102, and/or the geographic location of the command computing device 106 at the time the data wipe/data wipe operations were performed as a whole and/or for each data wipe operation that was performed, fourth data identifying the entity/entities and/or individual(s) that performed the data wipe/data wipe operations as a whole and/or each data wipe operation, fifth data identifying one or more devices (e.g., BIOS data) that performed the data wipe/data wipe operations as a whole and/or each data wipe operation, sixth data identifying the data that was wiped/erased from a storage device 202 and/or each storage sector 302 of a storage device 202 by the data wipe/data wipe operations as a whole and/or by each data wipe operation, seventh data for tamper-proofing data on a storage device 202 and/or the storage sector(s) 302 of a storage device 202 (e.g., via hashes of the data, metadata, etc.), and eighth data that can authenticate data integrity and/or a data wipe (e.g., via a digital signature, a private key/public key of a Public Key Infrastructure (PKI) protocol, metadata, etc.), among other data related to a data wipe and/or data wipe operations that are possible and contemplated herein.

A set of auditable traces can include any suitable quantity of parameters, data, and/or information related to a data wipe and/or data wipe operations performed on a storage device 202 and/or the storage sector(s) 302 of a storage device 202. In some embodiments, the set of auditable traces includes one of the parameters discussed above (e.g., the first data, the second data, the third data, the fourth data, the fifth data, or the sixth data). In other embodiments, the set of auditable traces includes two of the parameters discussed above (e.g., two of the first data, the second data, the third data, the fourth data, the fifth data, the sixth data, the seventh data, and the eighth data). In still other embodiments, the set of auditable traces includes three of the parameters discussed above (e.g., three of the first data, the second data, the third data, the fourth data, the fifth data, the sixth data, the seventh data, and the eighth data). In yet other embodiments, the set of auditable traces includes four of the parameters discussed above (e.g., four of the first data, the second data, the third data, the fourth data, the fifth data, the sixth data, the seventh data, and the eighth data). In further embodiments, the set of auditable traces includes five of the parameters discussed above (e.g., five of the first data, the second data, the third data, the fourth data, the fifth data, the sixth data, the seventh data, and the eighth data). In certain embodiments, the set of auditable traces includes six of the parameters discussed above (e.g., six of the first data, the second data, the third data, the fourth data, the fifth data, the sixth data, the seventh data, and the eighth data). In some embodiments, the set of auditable traces includes seven of the parameters discussed above (e.g., seven of the first data, the second data, the third data, the fourth data, the fifth data, the sixth data, the seventh data, and the eighth data). In still further embodiments, the set of auditable traces includes all of the parameters discussed above (e.g., each of the first data, the second data, the third data, the fourth data, the fifth data, the sixth data, the seventh data, and the eighth data). In yet further embodiments, the set of auditable traces includes all the parameters discussed above (e.g., each the first data, the second data, the third data, the fourth data, the fifth data, the sixth data, the seventh data, and the eighth data) and at least some additional data and/or information related to a data wipe and/or data wipe operations performed on a storage device 202 and/or the storage sector(s) 302 of a storage device 202.

In various embodiments, the trace module 504 is configured to generate one or more sets of auditable traces of a data wipe and/or data operations. In certain embodiments, the trace module 504 generates multiple iterations of the same set of auditable traces. In additional or alternative embodiments, the trace module 504 generates multiple different sets of auditable traces. In some embodiments, the trace module 504 generates multiple iterations of the same set of auditable traces and one or more different sets of auditable traces. In other embodiments, the trace module 504 generates a first set of auditable traces and one or more sets of auditable traces that are different than the first set of auditable traces. In further embodiments, the trace module 504 generates one or more first sets of auditable traces and one or more second sets of auditable traces that are different than the first set(s) of auditable traces.

The trace module 504, in various embodiments, is configured to write a set of auditable traces to each storage sector 302 of a storage device 202. In some embodiments, the same set of auditable traces is written to each storage sector 302. In other embodiments, the trace module 504 is configured to write the same set of auditable traces to at least two storage sectors 302 and/or write different sets of auditable traces (e.g., the different sets of auditable traces include at least one different parameter and/or the same parameter in the sets of auditable traces includes different data and/or information) to at least two storage sectors 302. In still other embodiments, the trace module 504 is configured to write a different set of auditable traces (e.g., the different sets of auditable traces include at least one different parameter and/or the same parameter in the sets of auditable traces includes different data and/or information) to each storage sector 302. In some embodiments, each different set of auditable traces can include one or more parameters, information and/or data related to the data wipe and/or data operations that is unique to its corresponding and/or associated storage sector 302 upon which it is stored.

In certain embodiments, the trace module 504 is configured to write a set of auditable traces of a data wipe to at least one storage sector 302 of a storage device 202 and not write a set of auditable traces of a data wipe to at least one storage sector 302 of the storage device 202. In additional or alternative embodiments, the trace module 504 is configured to write a set of auditable traces of a data wipe to at least one pre-determined storage sector 302 of a storage device 202, which can be any suitable storage sector(s) 302 of the storage device 202. In certain embodiments, the pre-determined storage sector 302 is a set and/or specific location and/or address on the storage device 202. In various non-limiting examples, the auditable trace(s) of a data wipe can be written to the first storage sector 302 (e.g., F0), a middle storage sector (e.g., F29 and/or F30), and/or the last storage sector 302 (e.g., Fn) of a storage device 202, among other quantities and/or locations/addresses that are possible and contemplated herein.

In further additional or alternative embodiments, the trace module 504 is configured to write a set of auditable traces of a data wipe to one or more randomly selected storage sectors 302 of a storage device 202. In various non-limiting examples, the auditable trace(s) of a data wipe can be randomly written to a storage sector 302 with a location/addresses of F17, F39, and/or F54 of a storage device 202, among other quantities of random locations and/or addresses that are possible and contemplated herein.

In still further additional or alternative embodiments, the trace module 504 is configured to write a set of auditable traces of a data wipe to multiple storage sectors 302 of a storage device 202 spaced apart a determined quantity of storage sectors 302, which can be any suitable spacing (e.g., 2 apart, 3 apart, 4 apart, 5 apart, 10 apart, 20 apart, 50 apart, 100 apart, etc., among other quantities and/or spacing of locations and/or addresses that are possible and contemplated herein). In various non-limiting examples, the trace module 504 is configured to write the auditable trace(s) of a data wipe to the odd numbered storage sectors 302, even numbered storage sectors 302, prime numbered storage sectors 302, etc. of a storage device 202, among other quantities and/or spacing of locations and/or addresses that are possible and contemplated herein.

In the various embodiments of the data wipe module 402, the order in which the storage sectors 302 are data wiped (e.g., erased and/or overwritten) by the overwrite module 502 may include any suitable order that is known or developed in the future. In various embodiments, the storage sectors 302 may be data wiped by the overwrite module 502 in a pre-set order, a random order, or one portion of the storage sectors 302 may be data wiped in a pre-set order and another portion of the storage sectors 302 data wiped in a random order.

In embodiments in which the trace module 504 writes a set of auditable traces to multiple storage sectors 302, the order in which the trace module 504 writes the sets of auditable traces to the storage sectors 302 may include any suitable order that is known or developed in the future. In various embodiments, the sets of auditable traces may be written to the storage sectors 302 in a pre-set order, written to the storage sectors 302 in a random order, or written to one or more storage sectors 302 in a pre-set order and written to one or more other storage sectors 302 in a random order.

In some embodiments, the storage sectors 302 are erased/overwritten by the overwrite module 502 and the trace module 504 writes the set(s) of auditable traces the storage sector(s) 302 via a set of erase commands and a set of write commands, respectively, of a TRIM technique and/or process. In other embodiments, the storage sectors 302 are erased/overwritten by the overwrite module 502 and the trace module 504 writes the set(s) of auditable traces the storage sector(s) 302 via a set of erase commands and a set of write commands, respectively, of a SMART technique and/or process. In still other embodiments, the storage sectors 302 are erased/overwritten by the overwrite module 502 via a set of erase commands of a SMART technique and/or process and the set(s) of auditable traces are written to the storage sector(s) 302 by the trace module 504 via a set of write commands of a TRIM technique and/or process. In certain embodiments, the storage sectors 302 are erased/overwritten by the overwrite module 502 via a set of erase commands of a TRIM technique and/or process and the set(s) of auditable traces are written to the storage sector(s) 302 by the trace module 504 via a set of write commands of a SMART technique and/or process.

In various embodiments, the trace module 504 is configured to write the set(s) of auditable traces to the storage device 202 and/or to the storage sector(s) 302 of a storage device 202 subsequent and/or after the overwrite module 502 has performed the overwrite operations of a data wipe and/or data wipe operations. As such, the operation(s) and/or function(s) performed by the trace module 504 can be considered a final operation and/or final function of a data wipe and/or data wipe operations, or at least a portion of the final operation and/or final function of a data wipe and/or data wipe operations.

Figure 4B:
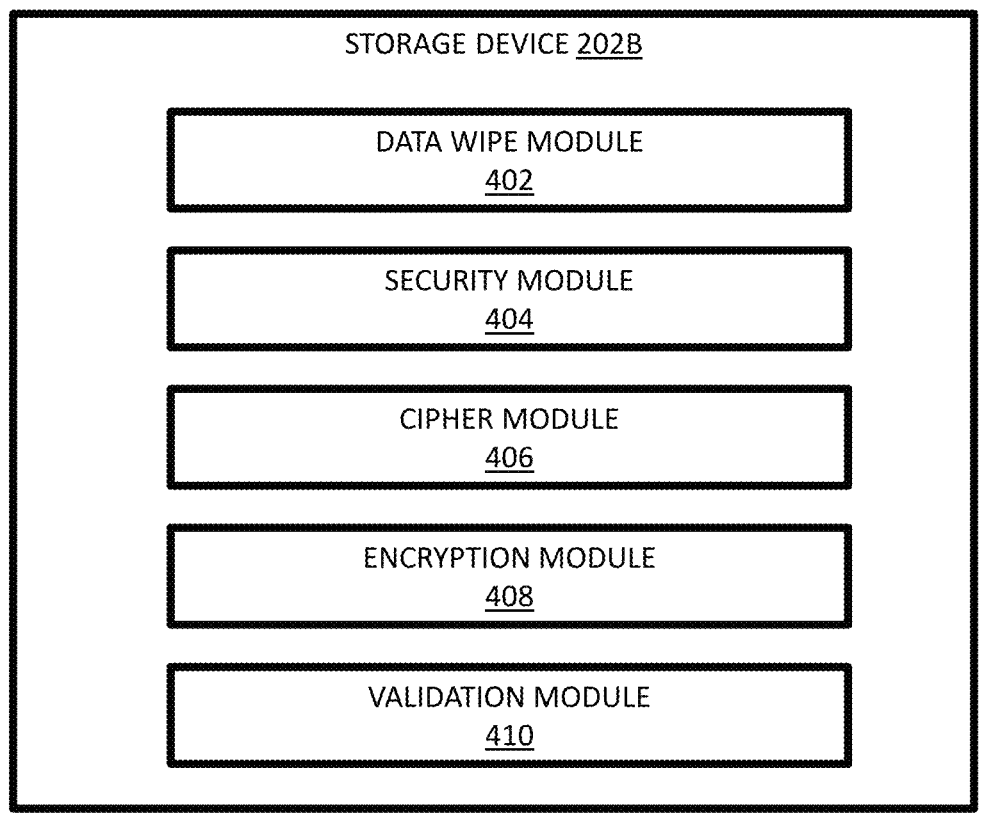

Referring now to FIG. 4B, FIG. 4B is a schematic block diagram of another embodiment of a storage device 202B. At least in the illustrated embodiment, the storage device 202B includes a data wipe module 402 similar to the storage device 202A discussed elsewhere herein with reference to FIG. 4A. At least in the illustrated embodiment, the storage device 202B further includes, among other components, a security module 404, a cipher module 406, an encryption module 408, and a validation module 410 configured to operate/function in conjunction with one another and the data wipe module 402 write auditable traces of a data wipe to one or more storage sectors 302 of a storage device 202 when executed by the processor 204.

A security module 404 may include any suitable hardware and/or software that can implement one or more security features and/or measures to a data wipe and/or data wipe operations. At least in the illustrated embodiment, the security module 404 is configured to write one or more fake and/or phony sets of auditable traces of a data wipe and/or data wipe operations to a storage device 202 and/or one or more storage sectors 302 of a storage device 202.

A security module 404 may write any suitable quantity of fake and/or phony sets of auditable traces of a data wipe and/or data wipe operations to a storage device 202 and/or one or more storage sectors 302 of a storage device 202. Further, each fake and/or phony set of auditable traces may include any suitable type of trace/parameter and/or quantity of traces/parameters such that each fake and/or phony set of auditable traces resembles and/or mimics an actual, real, and/or legitimate set of auditable traces.

In various embodiments, a fake and/or phony set of auditable traces can include one or more characteristics and/or features that can enable a user and/or auditor of a data wipe to identify a fake and/or phony set of auditable traces. The characteristic(s) and/or feature(s) can include any suitable characteristic and/or feature that is known or developed in the future that can identify a fake and/or phony set of auditable traces as such while still appearing as actual, real, and/or legitimate set of auditable traces to an unauthorized third party.

A cipher module 406 may include any suitable hardware and/or software that can encrypt data via a cipher. In various embodiments, the cipher module 406 is configured to encrypt one or more sets of auditable traces of a data wipe and/or one or more data tags on one or more storage sectors 302 of a storage device 202 via a cipher.

The cipher module 406 can encrypt the one or more sets of auditable traces of a data wipe and/or the data tag on one or more storage sectors 302 of a storage device 202 with any suitable cipher that is known or developed in the future. In certain embodiments, the cipher module 406 encrypts the one or more sets of auditable traces of a data wipe and/or the data tag on one or more storage sectors 302 of a storage device 202 with a stream cipher, among other ciphers that are possible and contemplated herein.

As discussed above, the auditable trace(s) and/or data tags encrypted by the stream cipher can substantially prevent and/or facilitate preventing unauthorized data from being stored in a storage device 202 and/or the storage sector(s) 302 of a storage device 202. That is, encryption of the auditable trace(s) and/or data tag(s) by the stream cipher can detect hidden data in the auditable trace(s) and/or storage sector(s) 302 because the end result of a bit validation process will show a bit change for the auditable trace(s) and/or storage sector(s) 302.

An encryption module 408 may include any suitable hardware and/or software that can encrypt data. In various embodiments, the encryption module 408 is configured to encrypt one or more sets of auditable traces that are written to and/or stored in one or more storage sectors 302 of a storage device 202.

The encryption module 408 can encrypt the one or more sets of auditable traces of a data wipe using any suitable encryption technique, algorithm, and/or key that is known or developed in the future. In certain embodiments, the encryption module 408 is configured to encrypt one or more sets of auditable traces of a data wipe with a selected and/or particular encryption technique and/or algorithm and sign the encrypted set(s) of auditable traces with a private key, secret key, and/or encoding key, which can be referred to herein individually and/or collectively as, a private key.

In various embodiments, the encryption module 408 is configured to encrypt the one or more sets of auditable traces of a data wipe and sign the encrypted set(s) of auditable traces with a private key in response to receiving a command from one or more entities and/or individuals that are responsible for performing the data wipe and/or data wipe operations on the storage device 202, which can be referred to herein individually and/or collectively as, a wiper, data wiper, wiping entity, and/or data wiping entity. In certain embodiments, the private key utilized by the data wiper to encrypt and sign the encrypted set(s) of auditable traces is embedded and/or encoded in the program and/or application utilized to perform the data wipe and/or data wipe operations.

In various embodiments, the encryption module 408 is configured to create the signature for the private key (e.g., a digest of the private key) by encrypting the private key. As such, the private key is generally inaccessible to anyone other than the data wiper.

In some embodiments, the encryption module 408 is configured to write an eye catcher that can signify and/or identify that a set of auditable traces are written to a storage sector 302. The eye catcher is written to and/or stored on the same storage sector 302 as a set of auditable traces so that the eye catcher and the set of auditable traces are co-located on a storage sector 302 (e.g., stored on the same storage sector 302).

The eye catcher can include any suitable data, flag, and/or identifier capable of signaling and/or identifying that a set of auditable traces are written to a storage sector 302. Accordingly, the eye catcher can be used to assist in and/or facilitate locating a co-located set of auditable traces for a data wipe and/or data wiping operations.

The private key can be encrypted using any suitable encryption technique and/or algorithm that is known or developed in the future that can encrypt a private key using a different encryption key than the private key and that can function as a signature for the private key and/or an encrypted digest of the private key. In various embodiments, the signature for the private key and/or the encrypted digest of the private key can be utilized by the validation module 410 to validate a data wipe and/or data wipe operations performed on a storage device 202 and/or the storage sector(s) 302 of a storage device 202.

A validation module 410 may include any suitable hardware and/or software that can validate a data wipe and/or data wipe operations. In various embodiments, the validation module 410 is configured to validate a data wipe and/or data wipe operations based on the signature or encrypted digest of a private key utilized by the data wiper to encrypt the set(s) of auditable traces written to and/or stored on the storage device 202 and/or in the storage sector(s) 302 of a storage device 202.

In some embodiments, the validation module 410 is configured to store a public key or public encryption key associated with and/or corresponding to the private key utilized by the data wiper to encrypt the set(s) of auditable traces written to and/or stored on the storage device 202 and/or in the storage sector(s) 302 of a storage device 202. Further, the validation module 410 is configured use the public key to validate the signature or encrypted digest of a private key.

While the public key is not utilized to decrypt the encrypted set(s) of auditable traces written to and/or stored on the storage device 202 and/or in the storage sector(s) 302 of a storage device 202, the public key is capable of being used by the validation module 410 (or a user of the storage device 202 and/or an auditor of a data wipe) to decrypt the signature and/or encrypted digest of the private key. Here, because the private key and the public key are different encryption/decryption keys, the private key and the public key can be considered and/or referred to herein as, an asymmetric pair of encryption keys, an asymmetric pair of keys, a pair of asymmetric encryption keys, and/or a pair of asymmetric keys.

In various embodiments, the validation module 410 is configured to validate a data wipe and/or data wipe operations in response to using the public key to successfully decrypt the signature and/or encrypted digest of the private key. In some embodiments, the validation module 410 can provide the private key to an auditor so that the auditor can view and verify the data wipe and/or data wipe operations in response to successfully decrypting the signature and/or encrypted digest of the private key. Here, the auditor can be identified in response to an entity or individual providing verified credentials to the validation module 410.

In addition, the validation module 410 is configured to not validate and/or invalidate a data wipe and/or data wipe operations in response to the public key being unable and/or incapable of successfully decrypting the signature and/or encrypted digest of the private key. In certain embodiments (e.g., embodiments in which two or more storage sectors 302 are connected for validation), the validation module 410 is configured to not validate and/or invalidate a data wipe and/or data wipe operations for each storage sector 302 in response to the data wipe and/or data wipe operations being invalidated on any one storage sector 302 (e.g., a single invalidation invalidates the data wipe and/or data wipe operations on all of the storage sectors 302).

In various embodiments, the validation module 410 can implement one or more key relation strategies including, for example, spawning multiple public keys from a private key or key block so that performing bulk data wipes and/or data wiping operations on multiple storage devices 202 can be performed. In certain embodiments, the spawned public key(s) can be generated by the validation module 410 on-the-spot and/or pre-shared with one or more users on a per copy basis. In embodiments in which multiple spawned public keys are generated on-the-spot, the validation module 410 can provide one or more of the spawned publics to one or more users for later use.

In various embodiments, the validation module 410, during a validation process and/or operations, can scan a set of storage sectors 302 to locate the set(s) of auditable traces stored on the storage sector(s) 302. In some embodiments, the validation module 410 is configured to locate a set of auditable traces via an eye catcher co-located with a set of auditable traces. That is, the validation module 410 can locate a set of auditable traces in response to finding an eye catcher that is located on the same storage sector 302 as the set of auditable traces.

Referring back to FIGS. 2A through 2C, a processor 204 may include any suitable non-volatile/persistent hardware and/or software configured to perform and/or facilitate performing functions and/or operations for writing auditable traces of a data wipe to a storage device. In various embodiments, the processor 204 includes hardware and/or software for executing instructions in one or more modules and/or applications that can perform and/or facilitate performing functions and/or operations for writing auditable traces of a data wipe to a storage device. The modules and/or applications executed by the processor 204 for writing auditable traces of a data wipe to a storage device can be stored on and executed from a storage device 202 and/or from the processor 204.

Figure 6A:
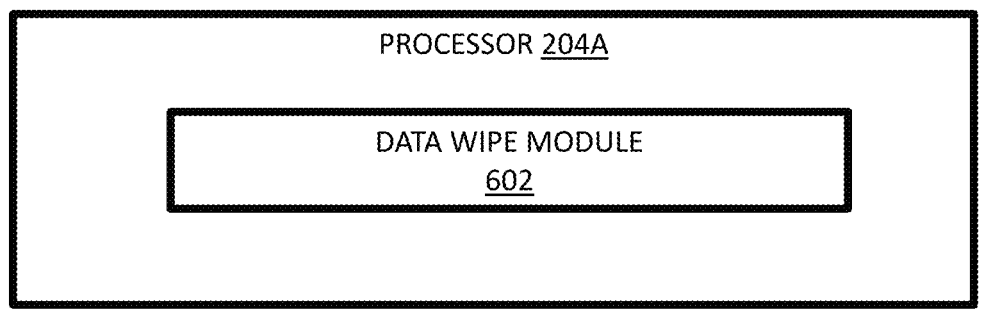
FIGS. 6A and 6B are schematic block diagrams illustrating various embodiments of a processor included in the host computing devices of FIGS. 2A through 2C.
Figure 7:
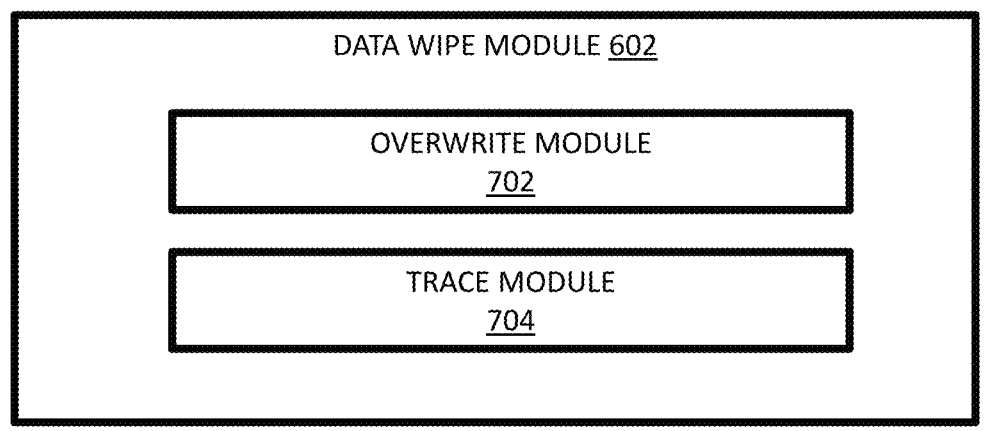
FIG. 7 is a block diagram illustrating one embodiment of a data wipe module included in the processors of FIGS. 6A and 6B.

With reference to FIG. 6A, FIG. 6A is a schematic block diagram of one embodiment of a processor 204A. At least in the illustrated embodiment, the processor 204A includes, among other components, a data wipe module 602 similar to the data wipe module 402 included in the storage device 202A discussed with reference to FIG. 4A. As illustrated in FIG. 7, various embodiments of a data write module 602 includes, among other components, an overwrite module 702 and a trace module 704 similar to the overwrite module 502 and trace module 504 in the data write module 402 discussed with reference to FIG. 5.

Figure 6B:
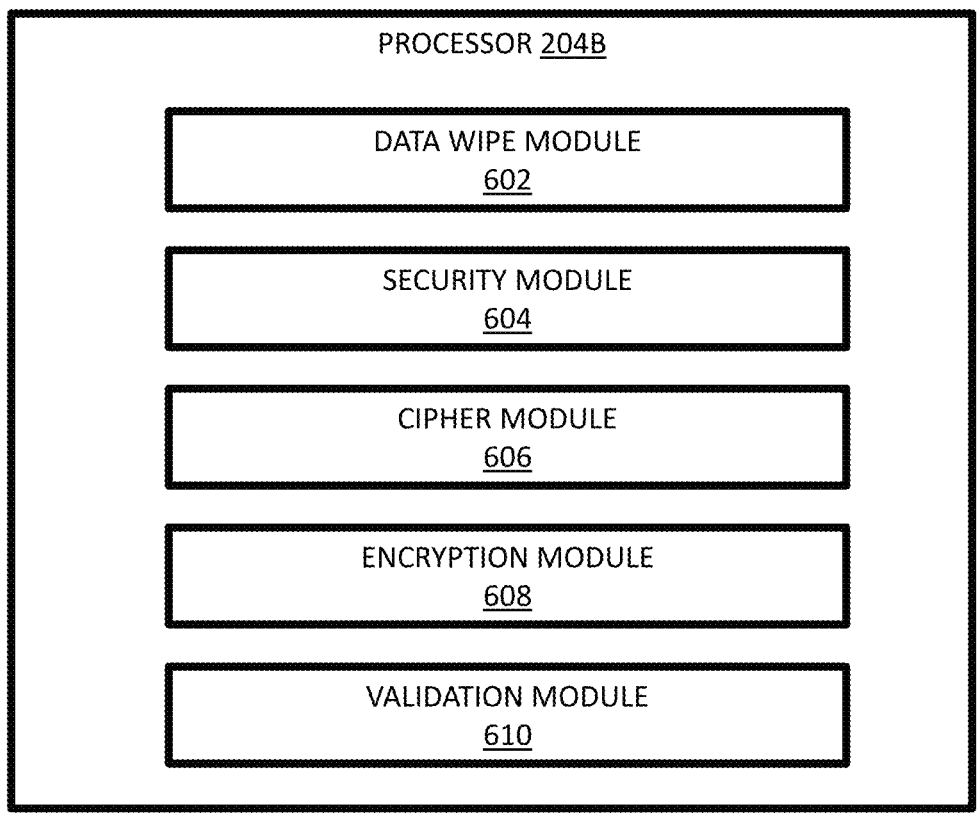

Referring to FIG. 6B, FIG. 6B is a schematic block diagram of another embodiment of a processor 204B. At least in the illustrated embodiment, the processor 204B includes, among other components, a data wipe module 602, a security module 604, a cipher module 606, an encryption module 608, and a validation module 610 similar to the data wipe module 402, security module 404, a cipher module 406, encryption module 408, and validation module 410 in the storage device 202B discussed with reference to FIG. 4B.

Figure 1D:
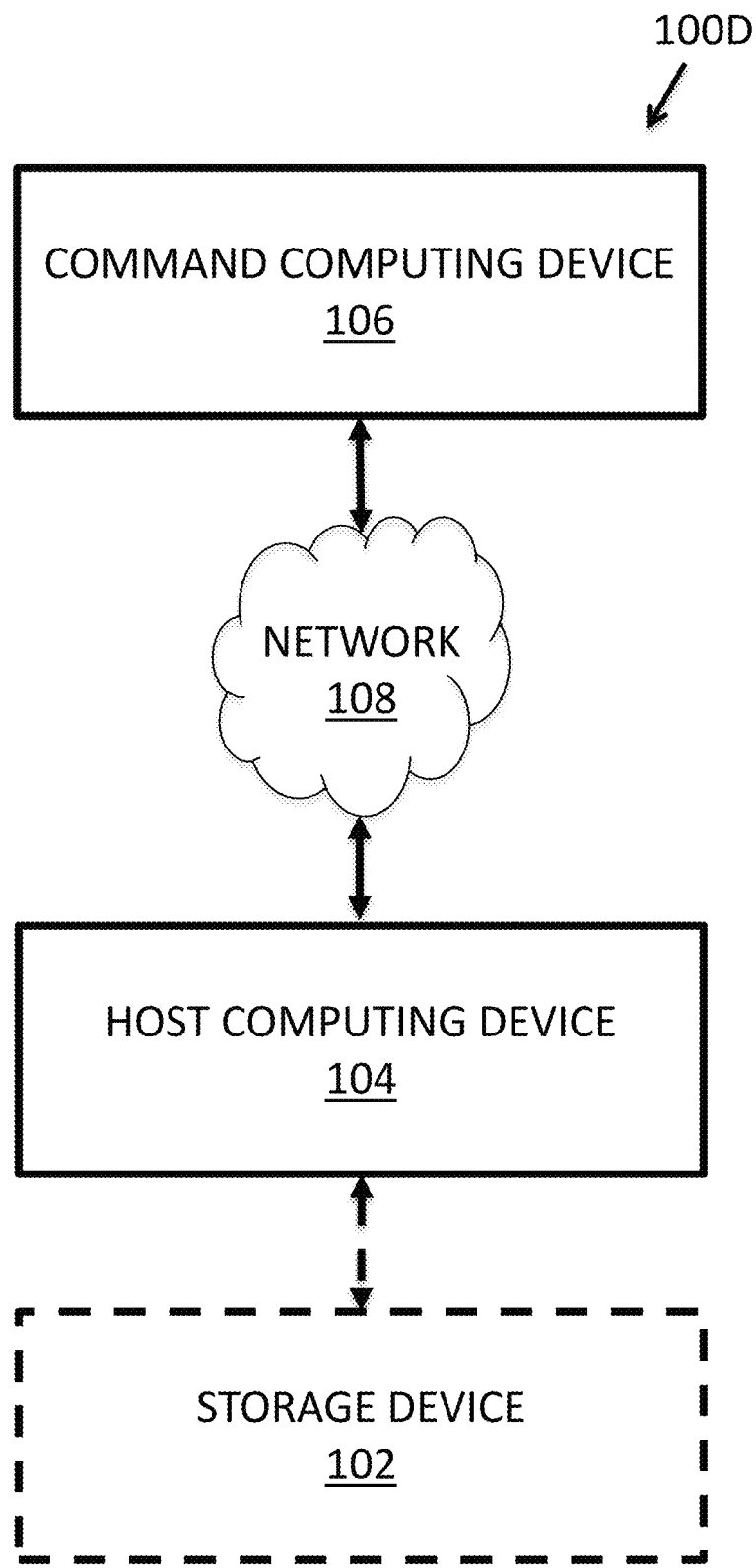

With reference to FIGS. 1B and 1D, a network 108 may include any suitable wired and/or wireless network (e.g., public and/or private computer networks in any number and/or configuration (e.g., the Internet, an intranet, a cloud network, etc.)) that is known or developed in the future that enables the host computing device 102 and the command computing device 106 to be coupled to and/or in communication with one another and/or to share resources. In various embodiments, the network 108 can comprise the Internet, a cloud network (IAN), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of communicating with one another that are possible and contemplated herein.

A command computing device 106 may include any suitable computer hardware and/or software that can store and exchange data with the user computing device 104. In various embodiments, a command computing device 106 can include one or more processors, computer-readable memory, and/or one or more interfaces, among other features and/or hardware. A command computing device 106 can further include any suitable software component or module, or computing device(s) that is/are capable of hosting and/or serving a software application or services, including distributed, enterprise, and/or cloud-based software applications, data, and services. For instance, a command computing device 106 can be configured to transmit commands to a host computing device 102 to write auditable traces of a data wipe to a storage device 202. In some instances, a command computing device 106 can be implemented as some combination of devices that can comprise a common computing system and/or device, server, server pool, or cloud computing environment and share computing resources, including shared memory, processors, and interfaces.

Figure 8A:
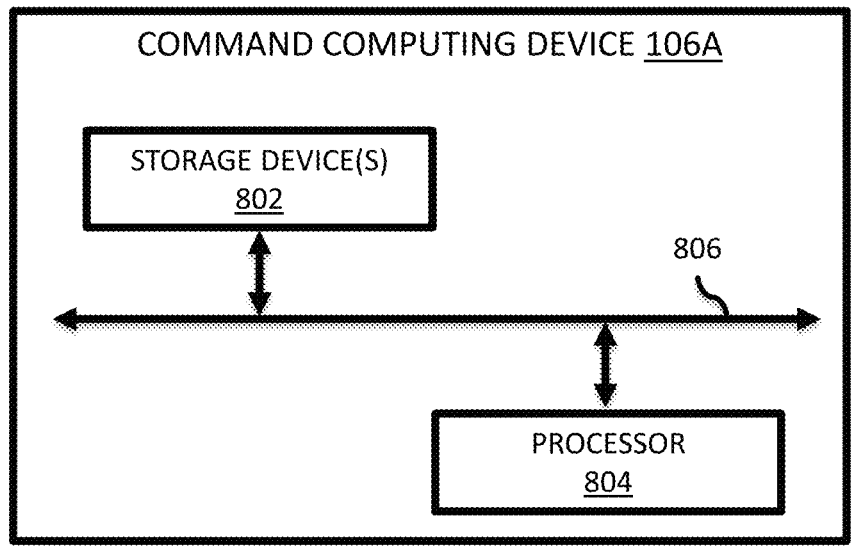
FIGS. 8A and 8B are schematic block diagrams illustrating various embodiments of a command computing device included in the systems of FIGS. 1C and 1D.
Figure 8B:
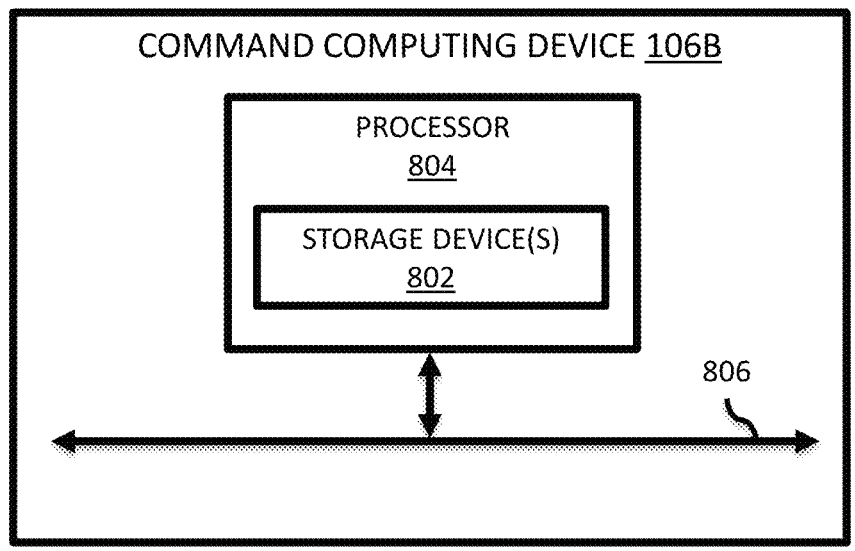

With reference to FIGS. 8A and 8B, FIGS. 8A and 8B are block diagrams of various embodiments of a command computing device 108A and 108B (also simply referred to individually, in various groups, or collectively as, command computing device(s) 108). At least in the embodiment illustrated in FIG. 8A, a command computing device 108A includes, among other components, one or more storage devices 802 coupled to and/or in communication with a processor 804 via a bus 806 (e.g., a wired and/or wireless bus). At least in the embodiment illustrated in FIG. 8B, a command computing device 108B includes, among other components, a processor 804 that includes one or more storage devices 802 coupled to and/or in communication with a bus 806.

A set of storage devices 802 may include any suitable quantity of memory devices 802. Further, a storage device 802 may include any suitable type of device and/or system that is known or developed in the future that can store computer-useable and/or computer-readable code. In various embodiments, a storage device 802 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 804).

A storage device 802, in some embodiments, includes volatile computer storage media. For example, a storage device 802 may include RAM, including DRAM, SDRAM, and/or SRAM. In other embodiments, a storage device 802 includes non-volatile computer storage media. For example, a storage device 802 may include a hard disk drive, a flash memory, and/or any other suitable non-volatile computer storage device that is known or developed in the future. In various embodiments, a storage device 802 includes both volatile and non-volatile computer storage media.

Figure 9:
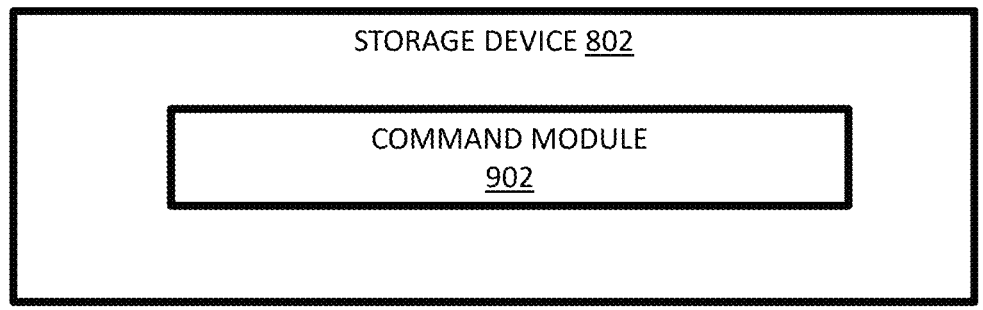
FIG. 9 is a schematic block diagram illustrating one embodiment of a storage device included in the command computing devices of FIGS. 8A and 8B.

With reference now to FIG. 9, FIG. 9 is a schematic block diagram of one embodiment of a storage device 802. At least in the illustrated embodiment, the memory device 802 includes, among other components, a command module 902.

A command module 902 may include any suitable hardware and/or software capable of transmitting commands for writing auditable traces of a data wipe to a storage device 202. In some embodiments, the command module 902 is configured to transmit commands to the host computing device 102 to perform its various operations and/or functions for writing auditable traces of a data wipe to a storage device 202, as discussed with reference to the various embodiments of a host computing device 102 discussed above.

Figure 10:
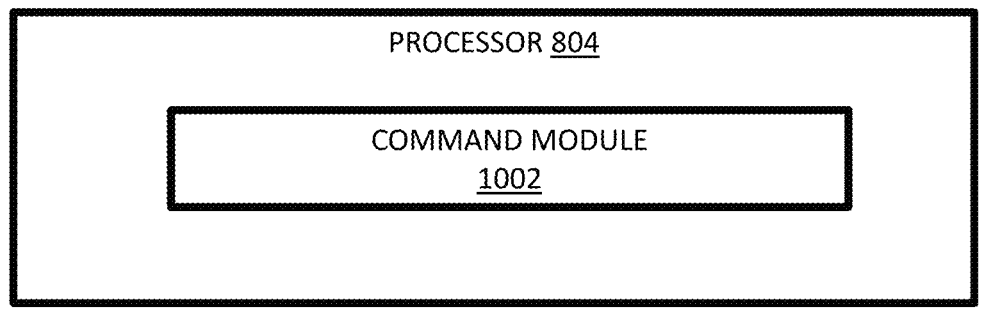
FIG. 10 is a schematic block diagram illustrating one embodiment of a processor included in the command computing devices of FIGS. 8A and 8B.

With reference to FIG. 10, FIG. 10 is a schematic block diagram of one embodiment of a processor 804. At least in the illustrated embodiment, the processor 804 includes, among other components, a command module 1002 similar to the command module 902 in the memory device 802 discussed with reference to FIG. 9.

Figure 11:
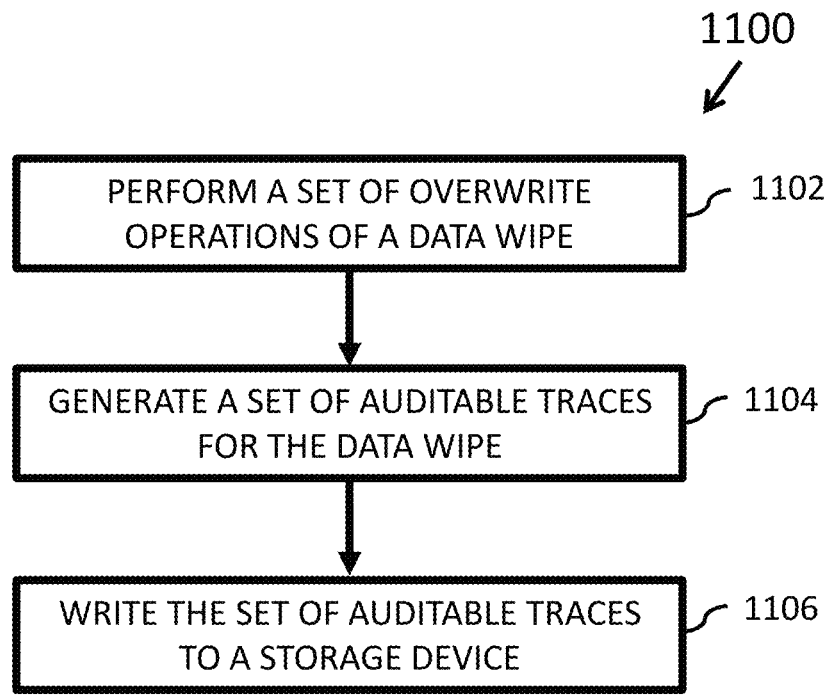
FIG. 11 is a schematic flow chart diagram illustrating one embodiment of a method for writing auditable traces of a data wipe to a storage device.

FIG. 11 is a schematic flow chart diagram illustrating one embodiment of a method 1100 for writing auditable traces of a data wipe to a storage device 202. At least in the illustrated embodiment, the method 1100 begins by a processor (e.g., processor 204) performing a set of overwrite operations of a data wipe (e.g., data wipe operations) on a storage device 202 of an information handling device (e.g., a computing device) (block 1102).

The method 1100 further includes the processor 204 generating a set of auditable traces for the data wipe (block 1104) and writing the set of auditable traces to a storage device 202 (block 1106). In various embodiments, the set of auditable traces may include any combination of the first data, second data, third data, fourth data fifth data, sixth data, seventh data, and/or eighth data, as discussed elsewhere herein. Further, writing the set of auditable traces to the storage device 202, in some embodiments, can be considered a final operation of a data wipe and/or data wipe operations.

Figure 12:
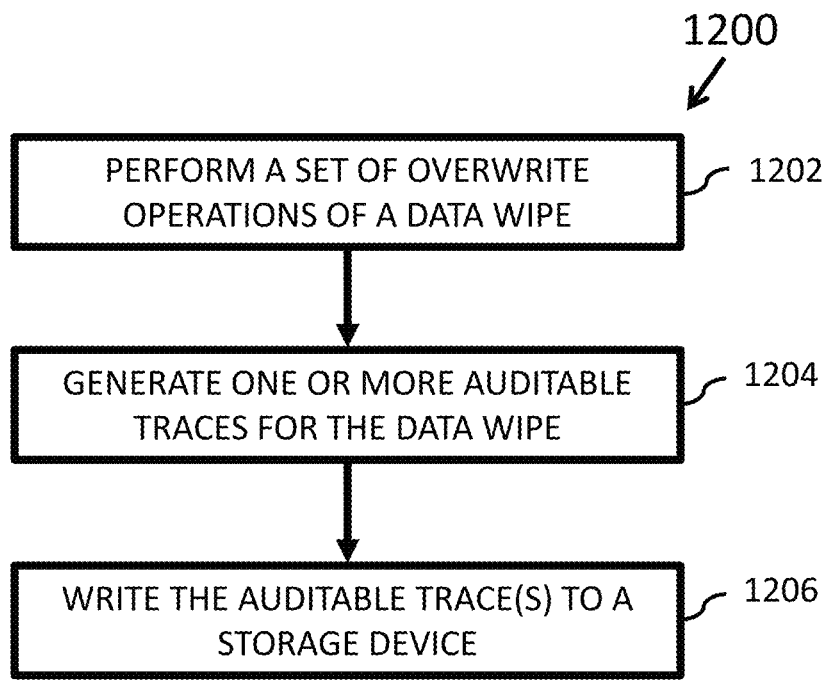
FIG. 12 is a schematic flow chart diagram illustrating another embodiment of a method for writing auditable traces of a data wipe to a storage device.

FIG. 12 is a schematic flow chart diagram illustrating another embodiment of a method 1200 for writing auditable traces of a data wipe to a storage device 202. At least in the illustrated embodiment, the method 1200 begins by a processor (e.g., processor 204) performing a set of overwrite operations of a data wipe (e.g., data wipe operations) on a storage device 202 of an information handling device (e.g., a computing device) (block 1202).

The method 1200 further includes the processor 204 generating one or more auditable traces for the data wipe (block 1204) and writing the auditable trace(s) to a storage device 202 (block 1206). In various embodiments, the auditable trace(s) may include any one or more of the first data, second data, third data, fourth data fifth data, sixth data, seventh data, and/or eighth data, as discussed elsewhere herein. Further, writing the auditable trace(s) to the storage device 202, in some embodiments, can be considered a final operation of a data wipe and/or data wipe operations.

Figure 13:
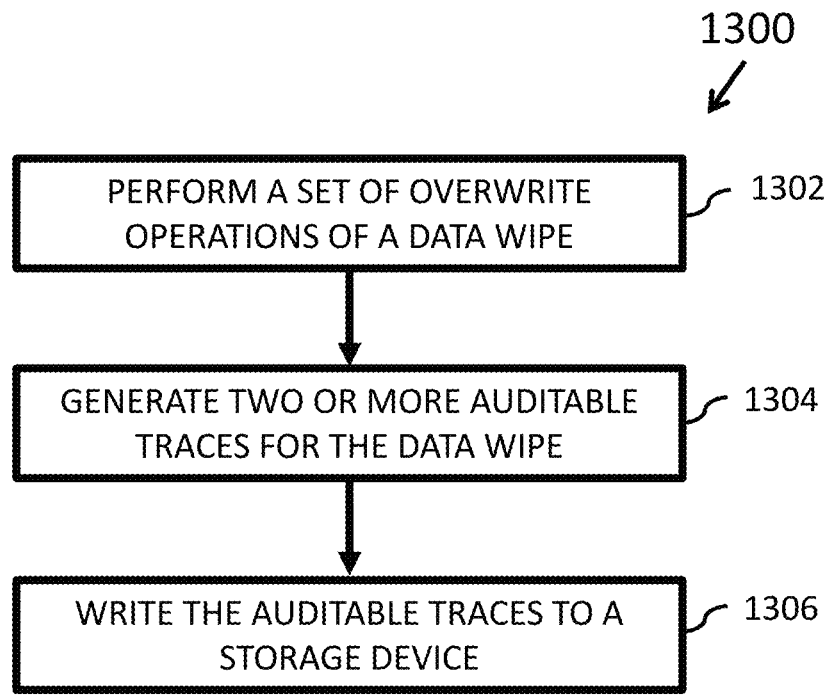
FIG. 13 is a schematic flow chart diagram illustrating still another embodiment of a method for writing auditable traces of a data wipe to a storage device.

FIG. 13 is a schematic flow chart diagram illustrating another embodiment of a method 1300 for writing auditable traces of a data wipe to a storage device 202. At least in the illustrated embodiment, the method 1300 begins by a processor (e.g., processor 204) performing a set of overwrite operations of a data wipe (e.g., data wipe operations) on a storage device 202 of an information handling device (e.g., a computing device) (block 1302).

The method 1300 further includes the processor 204 generating two or more auditable traces for the data wipe (block 1304) and writing the two or more auditable traces to a storage device 202 (block 1306). In various embodiments, the auditable traces may include any two or more of the first data, second data, third data, fourth data fifth data, sixth data, seventh data, and/or eighth data, as discussed elsewhere herein. Further, writing the auditable traces to the storage device 202, in some embodiments, can be considered a final operation of a data wipe and/or data wipe operations.

Figure 14:
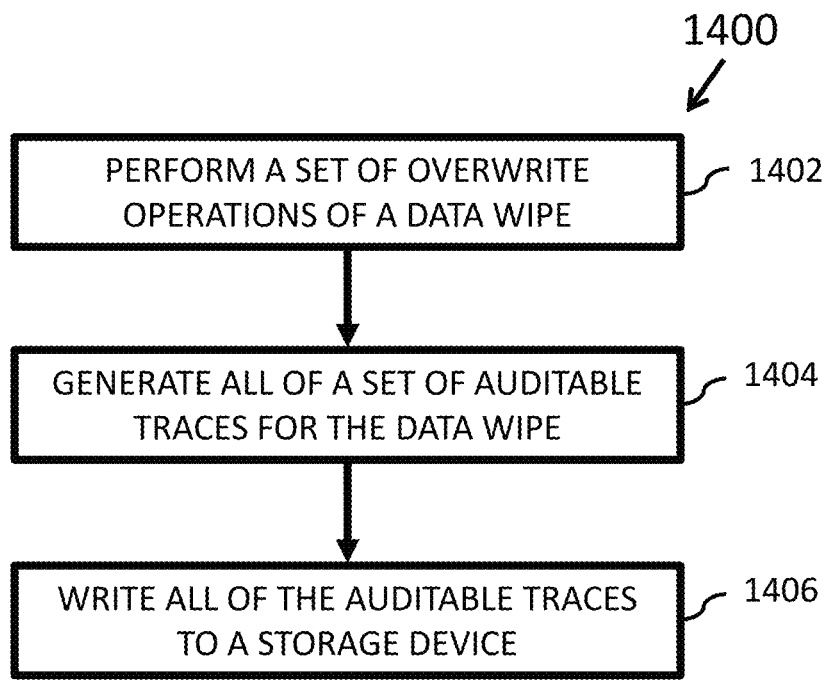
FIG. 14 is a schematic flow chart diagram illustrating yet another embodiment of a method for writing auditable traces of a data wipe to a storage device.

FIG. 14 is a schematic flow chart diagram illustrating still another embodiment of a method 1400 for writing auditable traces of a data wipe to a storage device 202. At least in the illustrated embodiment, the method 1400 begins by a processor (e.g., processor 204) performing a set of overwrite operations of a data wipe (e.g., data wipe operations) on a storage device 202 of an information handling device (e.g., a computing device) (block 1402).

The method 1400 further includes the processor 204 generating all of a set of auditable traces for the data wipe (block 1404) and writing all of the set of auditable traces to a storage device 202 (block 1406). In various embodiments, the set of auditable traces includes all the first data, second data, third data, fourth data fifth data, sixth data, seventh data, and eighth data, as discussed elsewhere herein. Further, writing all of the set of auditable traces to the storage device 202, in some embodiments, can be considered a final operation of a data wipe and/or data wipe operations.

Figure 15:
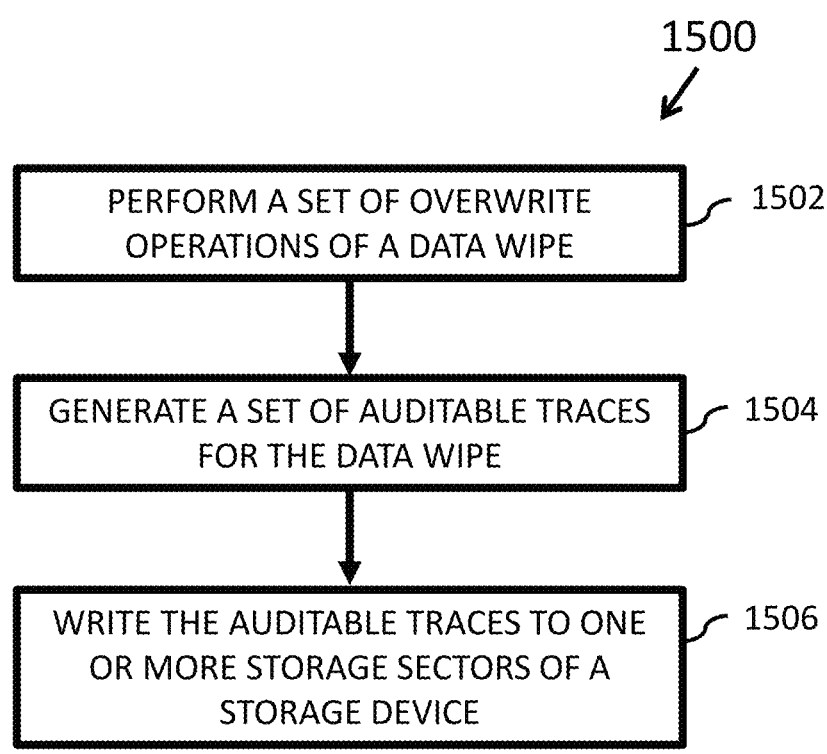
FIG. 15 is a schematic flow chart diagram illustrating one other embodiment of a method for writing auditable traces of a data wipe to a storage device.

FIG. 15 is a schematic flow chart diagram illustrating one embodiment of a method 1500 for writing auditable traces of a data wipe to a storage device 202. At least in the illustrated embodiment, the method 1500 begins by a processor (e.g., processor 204) performing a set of overwrite operations of a data wipe (e.g., data wipe operations) on a storage device 202 of an information handling device (e.g., a computing device) (block 1502).

The method 1500 further includes the processor 204 generating a set of auditable traces for the data wipe (block 1504) and writing the set of auditable traces to one or more storage sectors 302 of a storage device 202 (block 1506). In various embodiments, the set of auditable traces may include any combination of the first data, second data, third data, fourth data fifth data, sixth data, seventh data, and/or eighth data, as discussed elsewhere herein. Further, writing the set of auditable traces to the storage sector(s) 302, in some embodiments, can be considered a final operation of a data wipe and/or data wipe operations.

Figure 16:
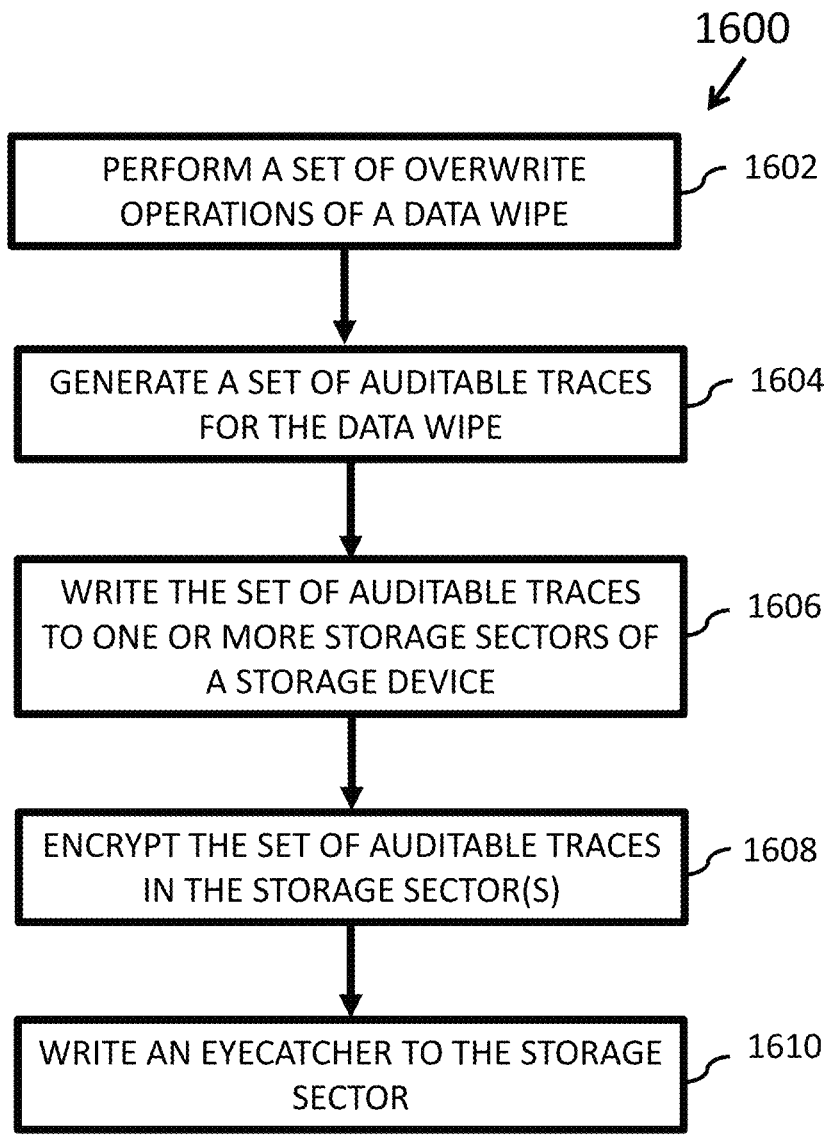
FIG. 16 is a schematic flow chart diagram illustrating another embodiment of a method for writing auditable traces of a data wipe to a storage device.

FIG. 16 is a schematic flow chart diagram illustrating one embodiment of a method 1600 for writing auditable traces of a data wipe to a storage device 202. At least in the illustrated embodiment, the method 1600 begins by a processor (e.g., processor 204) performing a set of overwrite operations of a data wipe (e.g., data wipe operations) on a storage device 202 of an information handling device (e.g., a computing device) (block 1602).

The method 1600 further includes the processor 204 generating a set of auditable traces for the data wipe (block 1604) and writing the set of auditable traces to one or more storage sectors 302 of a storage device 202 (block 1606). In various embodiments, the set of auditable traces may include any combination of the first data, second data, third data, fourth data fifth data, sixth data, seventh data, and/or eighth data, as discussed elsewhere herein. Further, writing the set of auditable traces to the storage sector(s) 302, in some embodiments, can be considered a final operation of a data wipe and/or data wipe operations.

The processor 204 further encrypts the set of auditable traces in the storage sector(s) 302 (block 1608). The set of auditable traces can be encrypted using any suitable encryption technique and/or algorithm, as discussed elsewhere herein.

The processor 204 may then write an eye catcher to the storage sector(s) 302 (block 1610). The eye catcher is written to the same storage sector 302 as a set of auditable traces so that the eye catcher is co-located with the set of auditable traces, as discussed elsewhere herein.

Figure 17:
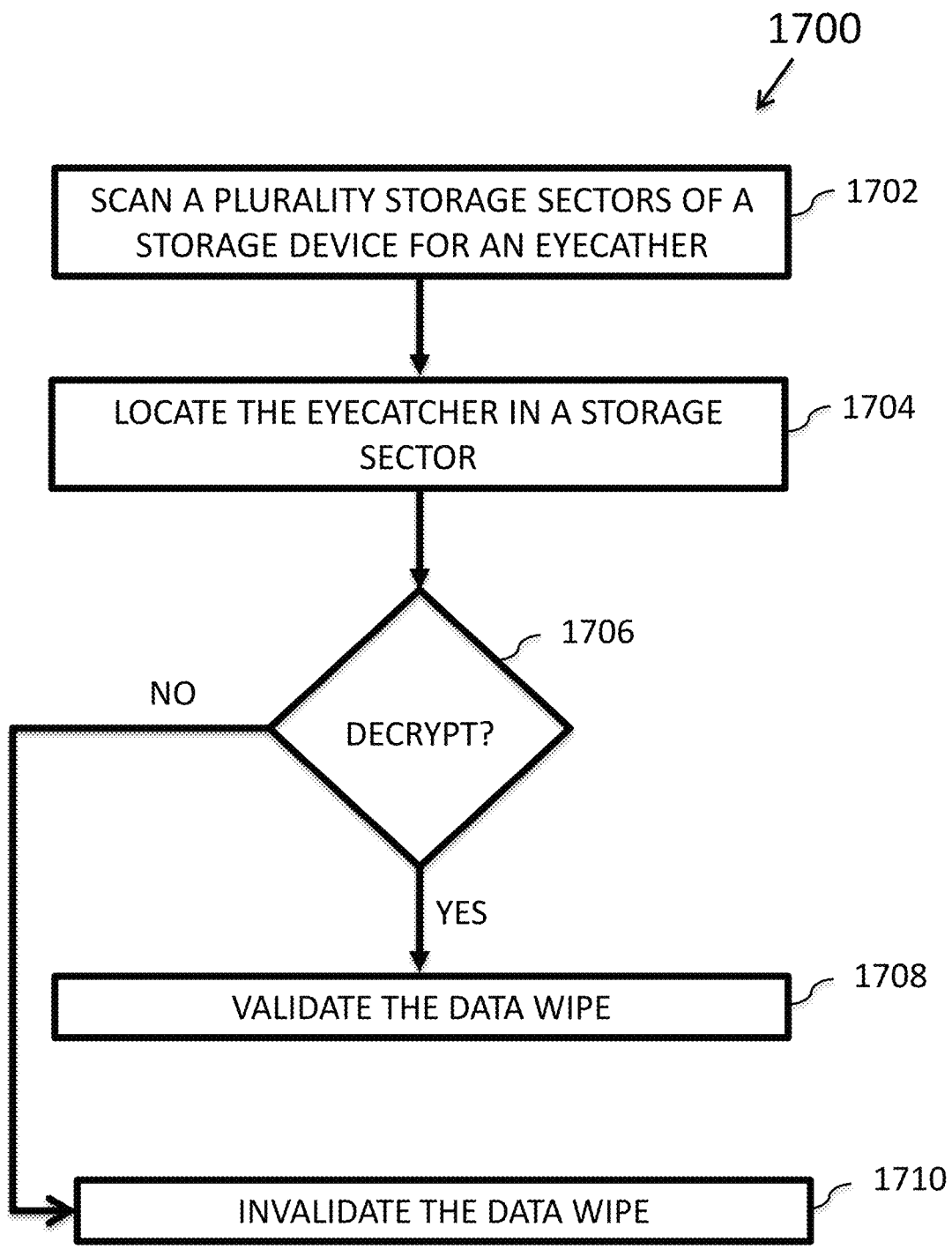
FIG. 17 is a schematic flow chart diagram illustrating one embodiment of a method that can validate a data wipe of a storage device that includes auditable traces of the data wipe written to the storage device that can be separate from and/or in addition to the method of FIG. 16.

FIG. 17 is a schematic flow chart diagram illustrating yet another embodiment of a method 1700 for writing auditable traces of a data wipe to a storage device 202. The method 1700 can be performed independent of and/or in addition to the method 1600 discussed with reference to FIG. 16.

At least in the illustrated embodiment, the method 1700 begins by a processor (e.g., processor 204) scanning a plurality of storage sector 302 of a storage device 202 for an eye catcher (block 1702) and locating the eye catcher (block 1704). The processor the attempts to decrypt a signature and/or an encrypted digest of a private key that encrypted a set of auditable traces for a data wipe co-located with the eye catcher on the storage sector 302 (block 1706).

In response to being able to decrypt the signature and/or encrypted digest (e.g., a "YES" in block 1706), the processor 204 validates the data wipe (block 1708). In response to being unable to decrypt the signature and/or encrypted digest (e.g., a "NO" in block 1706), the processor 204 do not validate and/or invalidates the data wipe (block 1710). In some embodiments, not validating and/or invalidating the data wipe on one storage sector 302 invalidates the data wipe for every storage sector 302 of a storage device 202, as discussed elsewhere herein.

Figure 18:
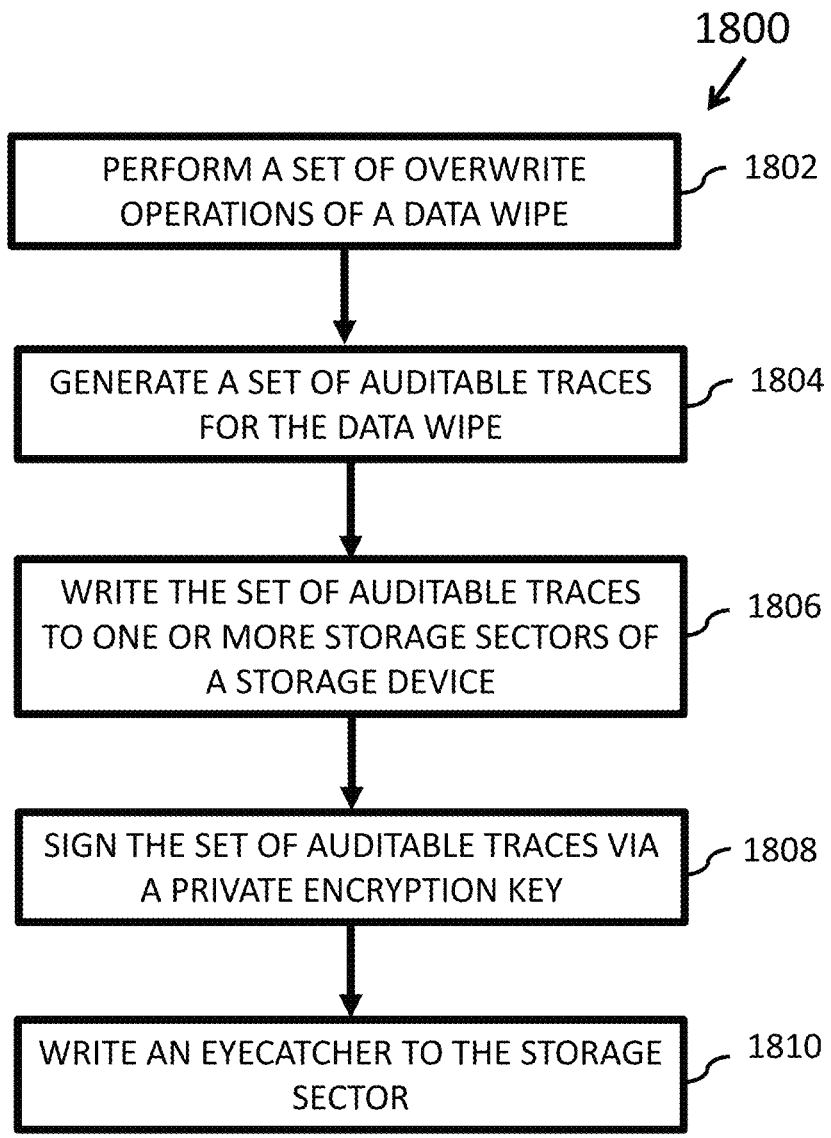
FIG. 18 is a schematic flow chart diagram illustrating yet another embodiment of a method for writing auditable traces of a data wipe to a storage device.

FIG. 18 is a schematic flow chart diagram illustrating another embodiment of a method 1800 for writing auditable traces of a data wipe to a storage device 202. At least in the illustrated embodiment, the method 1800 begins by a processor (e.g., processor 204) performing a set of overwrite operations of a data wipe (e.g., data wipe operations) on a storage device 202 of an information handling device (e.g., a computing device) (block 1602).

The method 1800 further includes the processor 204 generating a set of auditable traces for the data wipe (block 1804) and writing the set of auditable traces to one or more storage sectors 302 of a storage device 202 (block 1806). In various embodiments, the set of auditable traces may include any combination of the first data, second data, third data, fourth data fifth data, sixth data, seventh data, and/or eighth data, as discussed elsewhere herein. Further, writing the set of auditable traces to the storage sector(s) 302, in some embodiments, can be considered a final operation of a data wipe and/or data wipe operations.

The processor 204 further signs the set of auditable traces in the storage sector(s) 302 via a private encryption key (block 1808). The set of auditable traces can be encrypted using any suitable encryption technique and/or algorithm, as discussed elsewhere herein.

The processor 204 may then write an eye catcher to the storage sector(s) 302 (block 1810). The eye catcher is written to the same storage sector 302 as a set of auditable traces so that the eye catcher is co-located with the set of auditable traces, as discussed elsewhere herein.

Figure 19:
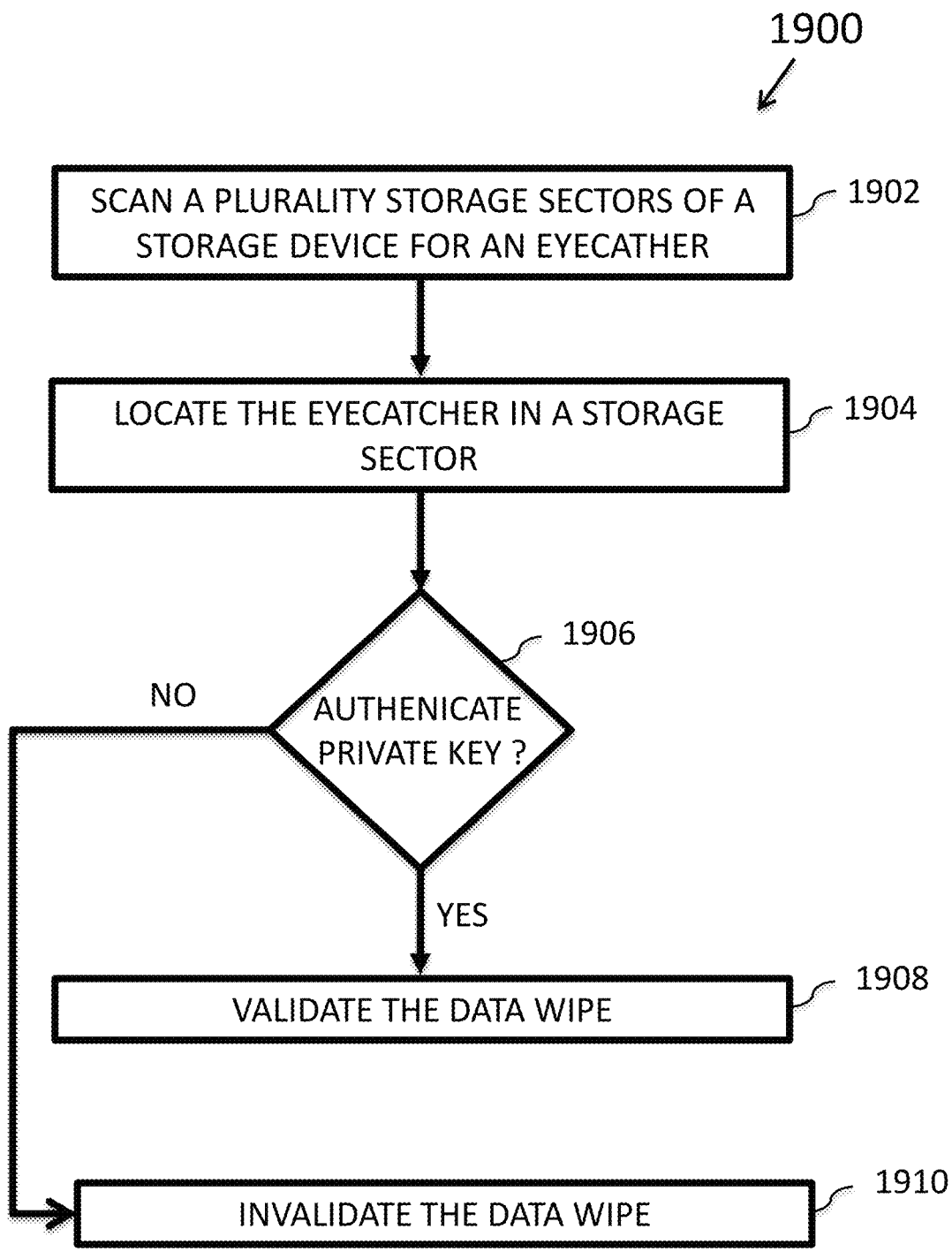
FIG. 19 is a schematic flow chart diagram illustrating another embodiment of a method that can validate a data wipe of a storage device that includes auditable traces of the data wipe written to the storage device that can be separate from and/or in addition to the method of FIG. 18.

FIG. 19 is a schematic flow chart diagram illustrating yet another embodiment of a method 1900 for writing auditable traces of a data wipe to a storage device 202. The method 1900 can be performed independent of and/or in addition to the method 1800 discussed with reference to FIG. 18.

At least in the illustrated embodiment, the method 1900 begins by a processor (e.g., processor 204) scanning a plurality of storage sector 302 of a storage device 202 for an eye catcher (block 1902) and locating the eye catcher (block 1904). The processor then uses a public encryption key to authenticate the private encryption key (block 1906).

In response to authenticating the private encryption key (e.g., a "YES" in block 1906), the processor 204 validates the data wipe (block 1908). In response to not authenticating the private encryption key (e.g., a "NO" in block 1906), the processor 204 invalidates the data wipe (block 1910). In some embodiments, not validating and/or invalidating the data wipe on one storage sector 302 invalidates the data wipe for every storage sector 302 of a storage device 202, as discussed elsewhere herein.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory configured to store code executable by the processor to:
perform a set of overwrite operations of a data wipe on a storage device,
generate a set of auditable traces for the data wipe, and
write the set of auditable traces to the storage device, wherein:
the set of auditable traces are written to at least a first storage sector on the storage device by a final operation, and
the final operation comprises writing a set of fake auditable traces for the data wipe to at least a second storage sector on the storage device.

2. The apparatus of claim 1, wherein writing the set of auditable traces comprises writing to the storage device one or more of:
first data identifying how the data wipe was performed;
second data identifying when the data wipe was performed;
third data identifying a geographic location where the data wipe was performed;
fourth data identifying at least one of an entity and an individual that performed the data wipe;
fifth data identifying a device that performed the data wipe;
sixth data identifying data what data was wiped;
seventh data for tamper-proofing data on the storage device; and
eighth data for authenticating the data wipe.

3. The apparatus of claim 1, wherein:
the storage device comprises a plurality of storage sectors;
performing the set of overwrite operations on the storage device comprises performing the set of overwrite operations on the plurality of storage sectors to data wipe each of the plurality of storage sectors; and
the executable code further causes the processor to:
encrypt the set of auditable traces on a data wiped storage sector of the plurality of data wiped storage sectors,
write an eyecatcher to the data wiped storage sector such that the eyecatcher and the encrypted set of auditable traces are co-located on the data wiped storage sector,
scan the plurality of data wiped storage sectors to locate the eyecatcher,
in response to locating the eyecatcher on the data wiped storage sector on which the eyecatcher and the encrypted set of auditable traces are co-located, attempt to decrypt the encrypted set of auditable traces on the data wiped storage sector,
validate the data wipe in response to being able to decrypt the encrypted set of auditable traces, and
invalidate the data wipe in response to being unable to decrypt the encrypted set of auditable traces.

4. The apparatus of claim 1, wherein:
the storage device comprises a plurality of storage sectors;
performing the set of overwrite operations on the storage device comprises performing the set of overwrite operations on the plurality of storage sectors to data wipe each of the plurality of storage sectors; and
the executable code further causes the processor to:
sign, via a private encryption key, the set of auditable traces on a data wiped storage sector of the plurality of data wiped storage sectors with a digital certificate,
write an eyecatcher to the data wiped storage sector such that the eyecatcher and the set of auditable traces are co-located on the data wiped storage sector,
scan the plurality of data wiped storage sectors to locate the eyecatcher,
in response to locating the eyecatcher on the data wiped storage sector on which the eyecatcher and the set of auditable traces are co-located, utilize a public encryption key to authenticate the private encryption key,
validate the data wipe in response to the public encryption key authenticating the private encryption key, and
invalidate the data wipe in response to the public encryption key not authenticating the private encryption key.

5. The apparatus of claim 1, wherein:
the storage device comprises a plurality of storage sectors;
performing the set of overwrite operations on the storage device comprises performing the set of overwrite operations on the plurality of storage sectors to data wipe each of the plurality of storage sectors; and the set of auditable traces are written to one or more storage sectors of the plurality of storage sectors by the final operation.

6. The apparatus of claim 1, wherein:

the storage device comprises a plurality of storage sectors;

performing the set of overwrite operations on the storage device comprises performing the set of overwrite operations on the plurality of storage sectors to data wipe each of the plurality of storage sectors;

the set of auditable traces are written to at least one pre-determined storage sector of the plurality of storage sectors by the final operation; and the set of auditable traces is not written to at least one storage sector of the plurality of storage sectors.

7. The apparatus of claim 1, wherein:

the storage device comprises a plurality of storage sectors;

performing the set of overwrite operations on the storage device comprises performing the set of overwrite operations on the plurality of storage sectors to data wipe each of the plurality of storage sectors; and the plurality of data wiped storage sectors are connected to one another for collective invalidation of the data wipe for the storage device such that invalidation of the data wipe for one storage sector invalidates the data wipe for all of the plurality of storage sectors.

8. A method, comprising:

performing, by a processor, a set of overwrite operations of a data wipe on a storage device;

generating a set of auditable traces for the data wipe; and writing the set of auditable traces to the storage device, wherein:

writing the set of auditable traces comprises writing the set of auditable traces to at least a first storage sector on the storage device by a final operation, and performing the final operation further comprises writing a set of fake auditable traces for the data wipe to at least a second storage sector on the storage device.

9. The method of claim 8, wherein writing the set of auditable traces comprises writing to the storage device one or more of:

first data identifying how the data wipe was performed;

second data identifying when the data wipe was performed;

third data identifying a geographic location where the data wipe was performed;

fourth data identifying at least one of an entity and an individual that performed the data wipe;

fifth data identifying a device that performed the data wipe;

sixth data identifying data what data was wiped;

seventh data for tamper-proofing data on the storage device; and eighth data for authenticating the data wipe.

10. The method of claim 8, wherein:

the storage device comprises a plurality of storage sectors;

performing the set of overwrite operations on the storage device comprises performing the set of overwrite operations on the plurality of storage sectors to data wipe each of the plurality of storage sectors; and the method further comprises:

encrypting the set of auditable traces on a data wiped storage sector of the plurality of data wiped storage sectors, writing an eyecatcher to the data wiped storage sector such that the eyecatcher and the encrypted set of auditable traces are co-located on the data wiped storage sector, scanning the plurality of data wiped storage sectors to locate the eyecatcher, in response to locating the eyecatcher on the data wiped storage sector on which the eyecatcher and the encrypted set of auditable traces are co-located, attempting to decrypt the encrypted set of auditable traces on the data wiped storage sector, validating the data wipe in response to being able to decrypt the encrypted set of auditable traces, and invalidating the data wipe in response to being unable to decrypt the encrypted set of auditable traces.

11. The method of claim 8, wherein:

the storage device comprises a plurality of storage sectors;

performing the set of overwrite operations on the storage device comprises performing the set of overwrite operations on the plurality of storage sectors to data wipe each of the plurality of storage sectors; and the method further comprises:

signing, via a private encryption key, the set of auditable traces on a data wiped storage sector of the plurality of data wiped storage sectors with a digital certificate, writing an eyecatcher to the data wiped storage sector such that the eyecatcher and the set of auditable traces are co-located on the data wiped storage sector, scanning the plurality of data wiped storage sectors to locate the eyecatcher, in response to locating the eyecatcher on the data wiped storage sector on which the eyecatcher and the set of auditable traces are co-located, utilizing a public encryption key to authenticate the private encryption key, validating the data wipe in response to the public encryption key authenticating the private encryption key, and invalidating the data wipe in response to the public encryption key not authenticating the private encryption key.

12. The method of claim 8, wherein:

performing the set of overwrite operations comprises performing the set of overwrite operations on a plurality of storage sectors of the storage device;

writing the set of auditable traces comprises writing the set of auditable traces to at least one pre-determined storage sector of the plurality of storage sectors by the final operation; and writing the set of auditable traces further comprises declining to write the set of auditable traces to at least one storage sector of the plurality of storage sectors by the final operation.

13. The method of claim 8, wherein:

performing the set of overwrite operations comprises performing the set of overwrite operations on a plurality of storage sectors of the storage device; and performing the final operation further comprises connecting the plurality of data wiped storage sectors to one another for collective invalidation of the data wipe for the storage device such that invalidation of the data wipe for one storage sector invalidates the data wipe for all of the plurality of storage sectors.

14. A computer program product comprising a computer-readable storage device including code embodied therewith, the code executable by a processor to cause the processor to:
- perform a set of overwrite operations of a data wipe on a storage device;
- generate a set of auditable traces for the data wipe; and
- write the set of auditable traces to the storage device, wherein:
  - writing the set of auditable traces comprises writing the set of auditable traces to at least a first storage sector on the storage device by a final operation, and
  - performing the final operation further comprises writing a set of fake auditable traces for the data wipe to at least a second storage sector on the storage device.

15. The computer program product of claim 14, wherein writing the set of auditable traces comprises writing to the storage device one or more of:
- first data identifying how the data wipe was performed;
- second data identifying when the data wipe was performed;
- third data identifying a geographic location where the data wipe was performed;
- fourth data identifying at least one of an entity and an individual that performed the data wipe;
- fifth data identifying a device that performed the data wipe; and
- sixth data identifying data what data was wiped.

16. The computer program product of claim 14, wherein:
the storage device comprises a plurality of storage sectors;
performing the set of overwrite operations on the storage device comprises performing the set of overwrite operations on the plurality of storage sectors to data wipe each of the plurality of storage sectors; and
the executable code further causes the processor to:
- encrypt the set of auditable traces on a data wiped storage sector of the plurality of data wiped storage sectors,
- write an eyecatcher to the data wiped storage sector such that the eyecatcher and the encrypted set of auditable traces are co-located on the data wiped storage sector,
- scan the plurality of data wiped storage sectors to locate the eyecatcher,
- in response to locating the eyecatcher on the data wiped storage sector on which the eyecatcher and the encrypted set of auditable traces are co-located, attempt to decrypt the encrypted set of auditable traces on the data wiped storage sector,
- validate the data wipe in response to being able to decrypt the encrypted set of auditable traces, and
- invalidate the data wipe in response to being unable to decrypt the encrypted set of auditable traces.

17. The computer program product of claim 14, wherein:
the storage device comprises a plurality of storage sectors;
performing the set of overwrite operations on the storage device comprises performing the set of overwrite operations on the plurality of storage sectors to data wipe each of the plurality of storage sectors; and
the executable code further causes the processor to:
- sign, via a private encryption key, the set of auditable traces on a data wiped storage sector of the plurality of data wiped storage sectors with a digital certificate,
- write an eyecatcher to the data wiped storage sector such that the eyecatcher and the set of auditable traces are co-located on the data wiped storage sector,
- scan the plurality of data wiped storage sectors to locate the eyecatcher,
- in response to locating the eyecatcher on the data wiped storage sector on which the eyecatcher and the set of auditable traces are co-located, utilize a public encryption key to authenticate the private encryption key,
- validate the data wipe in response to the public encryption key authenticating the private encryption key, and
- invalidate the data wipe in response to the public encryption key not authenticating the private encryption key.

18. The computer program product of claim 14, wherein:
the storage device comprises a plurality of storage sectors;
performing the set of overwrite operations on the storage device comprises performing the set of overwrite operations on the plurality of storage sectors to data wipe each of the plurality of storage sectors; and
the set of auditable traces are written to one or more storage sectors of the plurality of storage sectors by the final operation.

19. The computer program product of claim 14, wherein:
the storage device comprises a plurality of storage sectors;
performing the set of overwrite operations on the storage device comprises performing the set of overwrite operations on the plurality of storage sectors to data wipe each of the plurality of storage sectors;
the set of auditable traces are written to at least one pre-determined storage sector of the plurality of storage sectors by the final operation; and
the set of auditable traces is not written to at least one storage sector of the plurality of storage sectors.

20. The computer program product of claim 14, wherein:
the storage device comprises a plurality of storage sectors;
performing the set of overwrite operations on the storage device comprises performing the set of overwrite operations on the plurality of storage sectors to data wipe each of the plurality of storage sectors; and
the plurality of data wiped storage sectors are connected to one another for collective invalidation of the data wipe for the storage device such that invalidation of the data wipe for one storage sector invalidates the data wipe for all of the plurality of storage sectors.

* * * * *